United States Patent
Fusco et al.

(10) Patent No.: US 11,942,975 B2
(45) Date of Patent: Mar. 26, 2024

(54) APPARATUS AND METHOD FOR CORRECTING AN INPUT SIGNAL

(71) Applicant: Infineon Technologies AG, Neubiberg (DE)

(72) Inventors: Alessandra Fusco, Munich (DE); Christian Bretthauer, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 258 days.

(21) Appl. No.: 17/144,913

(22) Filed: Jan. 8, 2021

(65) Prior Publication Data

US 2021/0242891 A1    Aug. 5, 2021

(30) Foreign Application Priority Data

Feb. 4, 2020    (EP) .................................... 20155343

(51) Int. Cl.
*H04B 1/10*    (2006.01)

(52) U.S. Cl.
CPC ...................................... *H04B 1/10* (2013.01)

(58) Field of Classification Search
CPC ....... H04B 1/10; G01S 7/52004; G01S 15/10; G01S 7/5273; G06K 9/0051; G06K 9/0055
See application file for complete search history.

(56) References Cited

U.S. PATENT DOCUMENTS

| 5,487,129 A | * | 1/1996 | Paiss ....................... G10L 15/20 704/231 |
| 5,729,193 A | | 3/1998 | Grasmann et al. |
| 6,470,047 B1 | * | 10/2002 | Kleinerman ...... H04L 25/03267 375/232 |

(Continued)

FOREIGN PATENT DOCUMENTS

| KR | 20120035074 A | 4/2012 |
| WO | 2009051899 A1 | 4/2009 |

OTHER PUBLICATIONS

Lagler, Daniel et al., "A Single Ultrasonic Transducer Fast and Robust Short-Range Distance Measurement Method", IEEE International Ultrasonics Symposium (IUS), Oct. 6-9, 2019, pp. 2533-2536, XP033670962, DOI: 10.1109/ULTSYM.2019.8925554.

(Continued)

*Primary Examiner* — Jinsong Hu
*Assistant Examiner* — Rui M Hu
(74) *Attorney, Agent, or Firm* — Slater Matsil, LLP

(57) ABSTRACT

An apparatus for correcting an input signal is configured for receiving the input signal, the received input signal comprising a series of input values. The apparatus is configured for matching a series of template values to the series of input values by warping the series of template values and the series of input values relatively to each other so as to assign one or more template values to one or more input values, wherein the series of template values represents an approximation of a noise signal that is expected to be comprised in (Continued)

the input signal. The apparatus is configured for obtaining a series of corrected input values based on a mismatch between the input values and their respective assigned template values. The apparatus is configured for providing a corrected signal based on the series of corrected input values.

12 Claims, 19 Drawing Sheets

(56) References Cited

U.S. PATENT DOCUMENTS

| | | | | |
|---|---|---|---|---|
| 6,876,966 | B1* | 4/2005 | Deng | G10L 15/06 |
| | | | | 704/243 |
| 10,424,292 | B1* | 9/2019 | Thimsen | G10L 15/20 |
| 11,025,324 | B1* | 6/2021 | Ebenezer | H04B 17/345 |
| 2001/0001141 | A1* | 5/2001 | Sih | G10L 15/20 |
| | | | | 704/231 |
| 2002/0077813 | A1* | 6/2002 | Erell | G10L 15/20 |
| | | | | 704/E15.039 |
| 2003/0039171 | A1* | 2/2003 | Chiapetta | G01S 15/88 |
| | | | | 367/98 |
| 2003/0123420 | A1* | 7/2003 | Sherlock | H04W 24/00 |
| | | | | 370/328 |
| 2003/0215099 | A1* | 11/2003 | Daly | G10K 11/17833 |
| | | | | 381/86 |
| 2004/0030249 | A1* | 2/2004 | Willis | A61B 8/0833 |
| | | | | 600/437 |
| 2005/0038341 | A1* | 2/2005 | Willis | A61B 8/0841 |
| | | | | 600/443 |
| 2005/0060153 | A1* | 3/2005 | Gable | G10L 17/02 |
| | | | | 704/E17.005 |
| 2005/0283068 | A1* | 12/2005 | Zuccolotto | G01R 33/283 |
| | | | | 600/410 |
| 2006/0190181 | A1* | 8/2006 | Deffenbaugh | G01V 1/28 |
| | | | | 702/14 |
| 2007/0016073 | A1* | 1/2007 | Kim | A61B 8/06 |
| | | | | 600/473 |
| 2007/0064535 | A1* | 3/2007 | Burnstad | G01V 1/36 |
| | | | | 367/73 |
| 2009/0086863 | A1* | 4/2009 | Komninakis | H04B 1/109 |
| | | | | 375/346 |
| 2010/0016012 | A1* | 1/2010 | Valadon | H04L 25/03292 |
| | | | | 375/350 |
| 2011/0147004 | A1* | 6/2011 | Neelamani | G01V 1/36 |
| | | | | 703/2 |
| 2013/0195164 | A1* | 8/2013 | Chen | H04B 1/1676 |
| | | | | 375/340 |
| 2016/0217686 | A1* | 7/2016 | Lee | G01S 7/527 |
| 2016/0299227 | A1* | 10/2016 | Hallek | G01S 15/102 |
| 2018/0172440 | A1* | 6/2018 | Zhou | G01S 7/5273 |
| 2019/0011543 | A1* | 1/2019 | Gidel | G01S 7/497 |
| 2020/0033462 | A1* | 1/2020 | Ding | G01S 7/536 |
| 2020/0158867 | A1* | 5/2020 | Sugae | G01S 7/5273 |
| 2020/0174096 | A1* | 6/2020 | Cho | G01S 7/354 |
| 2020/0280831 | A1* | 9/2020 | Booij | H04L 67/54 |
| 2021/0033693 | A1* | 2/2021 | Chen | G01S 3/808 |
| 2021/0048901 | A1* | 2/2021 | Thomas | G06F 3/043 |
| 2021/0061601 | A1* | 3/2021 | Higashi | B65H 7/125 |
| 2021/0100531 | A1* | 4/2021 | Erkamp | A61B 8/12 |
| 2021/0156995 | A1* | 5/2021 | Ding | G01S 15/325 |
| 2021/0255296 | A1* | 8/2021 | Weissenmayer | G01S 15/60 |

OTHER PUBLICATIONS

Subodh, P. S., et al. "A Novel Method for Reverberation Cancellation in Single Ultrasonic Transducer based Measurement Systems", Digital signal processing, NDE2015, Nov. 26-28, 2015, 6 pages.

Wikipedia, "Dynamic time warping", Sep. 8, 2018, XP055658258, Retrieved from the Internet: URL: https://en.wikipedia.org/w/index.php?title=Dynamic_time_warping&oldid=858621158, 7 pages.

* cited by examiner

APPARATUS AND METHOD FOR CORRECTING AN INPUT SIGNAL

This application claims the benefit of European Application No. 20155343.5, filed on Feb. 4, 2020, which application is hereby incorporated herein by reference.

TECHNICAL FIELD

Embodiments of the present disclosure relate to an apparatus for correcting a signal and a method for correcting a signal. Further embodiments relate to an apparatus for obtaining an information about a time of flight of an ultrasonic signal. In particular, embodiments of the present disclosure relate to dynamic time warping for ultrasonic ringing template matching. Some embodiments relate to an adaptive ringing removal approach, based on Dynamic Time Warping (DTW) for template matching.

BACKGROUND

A signal, which may represent a measured size, may be corrupted by a noise signal superposing the signal or interfering with the signal. For extracting an information about the measured size from the signal, it may be necessary to correct the signal for the noise signal, in particular, if a signal to noise ratio of the signal is low. The source of the noise signal may be inherent to a system providing the signal so that the noise signal may reoccur in similar forms in subsequent sequences of the signal. Thus, the noise signal may be approximated by a template which may be used to correct the signal for the noise signal.

For example, Capacitive Micro Machined Ultrasonic Transducers (CMUTs) enable the design of small and low cost proximity sensors for application areas such as mobile phones. Precise range finding with ultrasonic signals may be achieved via time of flight (TOF) estimation based on pulse compression on the received echo. For single CMUT transceiver designs, the lower limit of the detection range, for example a minimum distance between the transceiver and an object to be detected, may be constrained by a transmit pulse width and membrane ringing, resulting in a blanking zone where possibly no echo signal can be detected. For example, the CMUT may comprise a Micro-Electro-Mechanical System (MEMS) for transmitting an ultrasonic pulse and for receiving an echo. Directly after transmitting the ultrasonic pulse, a ringing of a membrane of the MEMS transceiver may superpose a signal provided by the MEMS transceiver. Close proximity measurements may only be achieved if the aforementioned ringing, a noise signal, is removed from the signal, for example, via proper subtraction approaches. Common template removal methods result to be effective as long as there is good agreement between the template and the current signal, otherwise the subtraction procedure may become counterproductive, leading to false positive echo detection in correspondence of artefact peaks. Several approaches are known for overcoming the issues of imprecise or varying templates. For example, known approaches for generalized use of training data involve, for instance, the construction of a signal template by averaging patterns in a single cluster. When referring to ultrasonic signal processing, a known solution applies a reverberation signal suppression chain including a phase matching block, followed by a template bank, where to select the best fitting template.

However, considering the current solutions, there is still a need for a concept for correcting a signal, providing an improved trade-off between computational effort, effective noise filtering, and being capable of adapting the correction according to a variation of a noise signal.

Such a need can be solved by the apparatuses and the methods according to the independent claims. In addition, specific implementations of different embodiments of the apparatuses and methods are defined in the dependent claims.

SUMMARY

According to an embodiment, an apparatus for correcting an input signal is configured for receiving the input signal, the received input signal comprising a series of input values. The apparatus is configured for matching a series of template values to the series of input values by warping the series of template values and the series of input values relatively to each other so as to assign one or more template values to one or more input values, wherein the series of template values represents an approximation of a noise signal that is expected to be comprised in the input signal. Further, the apparatus is configured for obtaining a series of corrected input values based on a mismatch between the input values and their respective assigned template values. The apparatus is configured for providing a corrected signal based on the series of corrected input values.

According to another embodiment, an apparatus for obtaining an information about a TOF of an ultrasonic signal comprises: a transceiver configured for transmitting the ultrasonic signal during a first time span, and configured for receiving an ultrasonic signal during a second time span, wherein the transceiver is configured for providing an input signal comprising the received ultrasonic signal in a time series; the apparatus for correcting an input signal according to the above embodiment, configured for receiving the input signal and configured for providing the corrected signal; means for obtaining the information about the TOF of the ultrasonic signal by evaluating the corrected signal.

According to another embodiment, a method for correcting an input signal comprises: receiving the input signal, the received input signal comprising a series of input values; matching a series of template values to the series of input values by warping the series of template values and the series of input values relative to each other so as to assign one or more template values to one or more input values, wherein the series of template values represents an approximation of a noise signal that is expected to be comprised in the input signal; obtaining a series of corrected input values based on a mismatch between the input values and their respective assigned template values; providing a corrected signal based on the series of corrected input values.

BRIEF DESCRIPTION OF THE DRAWINGS

Embodiments of the disclosure are described herein making reference to the penned drawings and figures.

DETAILED DESCRIPTION OF ILLUSTRATIVE EMBODIMENTS

In the following description, embodiments are discussed in detail, however, it should be appreciated that the embodiments provide many applicable concepts that can be embodied in a wide variety of correcting an input signal. The specific embodiments discussed are merely illustrative of specific ways to implement and use the present concept, and do not limit the scope of the embodiments. In the following description of embodiments, the same or similar elements that have the same functionality are provided with the same reference sign or are identified with the same name, and a repeated description of elements provided with the same reference number or being identified with the same name is typically omitted. Hence, descriptions provided for elements having the same or similar reference numbers or being identified with the same names are mutually exchangeable or may be applied to one another in the different embodiments. In the following description, a plurality of details is set forth to provide a more thorough explanation of embodiments of the disclosure. However, it will be apparent to one skilled it the art that other embodiments may be practiced without these specific details. In other instances, well-known structures and devices are shown in block diagram form rather than in detail in order to avoid obscuring examples described herein. In addition, features of the different embodiments described herein may be combined with each other, unless specifically noted otherwise.

Figure 1:
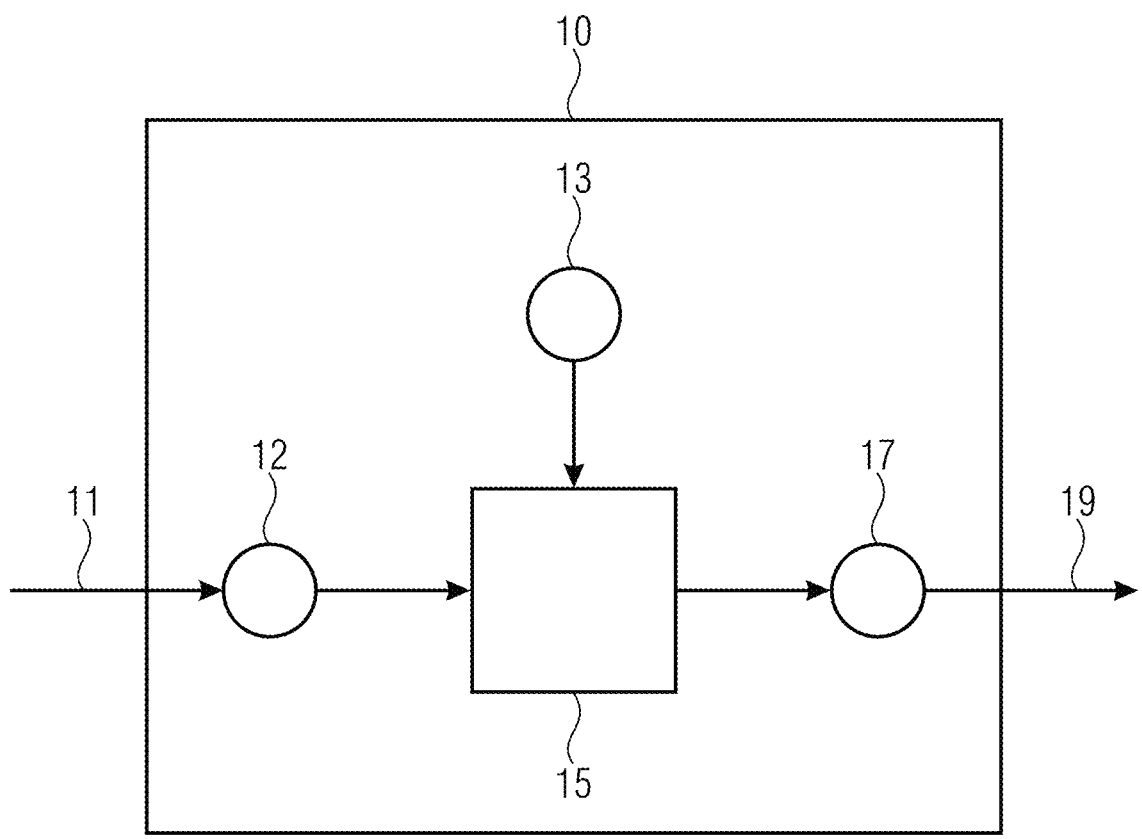
FIG. 1 shows a schematic representation of an apparatus for correcting an input signal according to an embodiment.

FIG. 1 shows a schematic representation of an apparatus 10 for correcting an input signal 11 according to an embodiment. The apparatus 10 is configured for receiving the input signal 11, the received input signal 11 comprising a series of input values 12. The apparatus 10 comprises means, such as a matching unit 15, for matching a series of template values 13 to the series of input values 12 by warping the series of template values 13 and the series of input values 12 relative to each other so as to assign one or more template values of the series of template values 13 to one or more input values of the series of input values 12. The series of template values 13 represents an approximation of a noise signal that is expected to be part of the input signal 11. For example, the noise signal may superpose or corrupt a signal of interest that may be comprised in the input signal 11. The apparatus 10 is configured for obtaining a series of corrected input values 17 based on a mismatch between the input values 12 and their respective assigned template values 13. The apparatus 10 is further configured for providing a corrected signal 19 based on the series of corrected input values 17.

Thus, in embodiments of the present disclosure, the series of template values 13, also referred to as template 13 in the following, may be used to correct the input signal 11 for an expected noise signal. To account for deviations between the template 13 and the noise signal, the series of template values 13 may be matched to the series of input values 12 by warping. For example, the series of template values 13 may be generated during a calibration process of a device or may rely on a general knowledge about a specific type of device or noise signal.

For example, a value of a series of values, e.g. a template value or an input value, may be attributed an index describing a position of the value within the series of values. The index of the value may be attributed an index value within an index value interval. For example, warping a series of values may comprise shifting or changing the index value of a value of the series, for example within the index value interval. For example, a series may be warped linearly or non-linearly by stretching or shrinking a spacing of the index values of neighboring values of the series, although the index of the values may remain unaltered. For example the series of input values 12 and the series of template values 13 may have same or overlapping index value intervals. Thus, warping one or both series may comprise assigning a template value with a first index value to an input value with a second index value which is different from the first index value. Assigning the template values to the input values based on the matching of the series of template values 13 and the series of input values 12 may adapt the series of template values 13 to the noise signal that may be comprised in the series of input values 12, even if the series of template values 13 is distorted with respect to the noise signal.

For example, a mismatch between an input value and its assigned template value may be determined based on a distance, an absolute distance, or a difference between the values. Thus, the corrected values of the series of corrected input values 17 may be based on the determined mismatch of a template value and an input value. Thus, corrected signal 19 may be based on the series of corrected values 17 may within an index value interval of the series of input values. For example, the corrected signal 19 may comprise the series of corrected input values 17. For example, the corrected signal 19 may be obtained from the input signal n by replacing the series of input values 12 by the series of corrected input values 17, for example by a patching or a stitching operation. That is, the input signal n may be patched with the series of corrected input values 12. Alternatively, the series of corrected input values 17 and a part of the input signal n that is not part of the series of input values 12 may be stitched or joined.

By obtaining the series of corrected input values 17 by considering a mismatch of associated template values and input values, the association between the template values and the input values being based on the matching of the series of template values 13 to the series of input values 12, artefacts, which may arise from considering unmatched values, may be avoided or reduced. Thus, a correction of the input signal n with the template 13, for example, comprising a template subtraction, may be effectively performed despite of variances of the noise signal with respect to the template 13. Such variances may occur, for example, due to manufacturing differences among measurement devices, due to a change of a measurement conditions or setup, or due to a change of the measurement device, for example due to aging, or degradation of single components. Thus, the apparatus 10 may also compensate input signals n provided by different devices by using a generalized template 13, and despite of modifications that might appear overtime. As the series of template values 13 is matched to the input signal comprising the noise signal, a single template 13 may be sufficient for correcting many or all possible variations of the input signal or the noise signal, for example without the need of a template library. Therefore, the apparatus 10 may have low memory requirements. Also, the apparatus 10 may correct the input signal 11 with low computational effort. For these reasons, the apparatus 10 may be advantageously implemented in mobile applications. Further, matching the series of template values 13 to the series of input values by warping may show high performance even if a width and a shape of the template 13 have large variances.

According to an embodiment, matching the series of template values 13 to the series of input values 12 comprises assigning one or more template values to one or more input values so as to decrease or minimize a sum of absolute distances between the input values and their respective assigned template values. For example, the absolute distances may be calculated using Euclidean or Manhattan metrics. For example, the matching may comprise choosing an input value that is to be assigned to a template value, or vice versa, so that the sum of absolute distances may be decreased. This way of assigning template values and input values to each other may be a particularly efficient way to match the two series, so that a computational effort for correcting the input signal may be small.

According to an embodiment, the series of input values 12 and the series of template values 13 may be represented by a series X having a number of M input values and a series Y having a number of N template values, respectively.

$$X = x_1, x_2, \ldots x_{|M|}$$

$$Y = y_1, y_2, \ldots y_{|N|}$$

Matching the series of input values 12 and the series of template values 13 may comprise decreasing a distance of a warping path $W = w_1, w_2, \ldots w_{|K|}$, wherein the $k^{th}$ element of the warping path is $w_k = (i, j)$, with i being an index from time series X, and j being an index from time series Y. Thus, the warping path may define the assignment between the input values and the template values. The distance of the warping path $Dist(W)$, which may be referred to as figure of merit, may for example be calculated as:

$$Dist(W) = \sum_{k=1}^{k=K} Dist(w_{ki}, w_{kj})$$

For example, $w_{ki}$ and $w_{kj}$ may refer to $x_i$ and $y_j$, the indices i and j being defined by $w_k$.

According to an embodiment, matching the series of input values 12 and the series of template values 13 comprises assigning the first input value of the series of input values 12 to the first template value of the series of template values 13 and the last template value of the series of template values 13 to the last input value of the series of input values 12. Further, the series may be matched so that a first input value assigned to a first template value has a lower or equal index than a second input value assigned to a second template value if the index of the first template value is lower than or equal to the index of the second template value. Thus, the warping of the series may preserve the order of the values of the series and the boundaries of the series. As the boundaries may be preserved, discontinuities may be avoided, for example a discontinuity of the series of input values to a neighboring part of the input signal.

According to an embodiment, matching the series of template values 13 to the series of input values 12 comprises using dynamic time warping algorithm for assigning the template values to the input values. Using the DTW algorithm may be very efficient for obtaining a warping path, e.g. the warping path W, and may result in a very accurate matching of multiple series. For example, allowed transformations in DTW may be only time and amplitude warping. Using the DTW algorithm may provide a fast matching of the series of template values 13 to the series of input values 12 with low computational effort. In other words, the DTW algorithm may find a good or an optimal alignment between two series, if one series may be warped non-linearly by stretching or shrinking it along its domain, for example if one time series may be warped non-linearly by stretching or shrinking it along its time axis. This warping may then be used to find corresponding regions between the two series, for example, time series, and to determine the similarity between the two.

According to an embodiment, the series of input values 12 and the series of template values 13 have equal lengths. Equal lengths of the two series may enhance an efficiency of the matching of the two series and/or may enhance an efficiency of determining a mismatch or a difference between values of the series, or may be beneficial for providing the corrected signal 19. For example, the series of input values 12 and the series of template values 13 have equal lengths, and a spacing between the input values and a spacing between the template values may be constant throughout the series. Thus, an matching the series, and obtaining the series of corrected input values may rely on indices of the template values and the input values and the corrected input values, e.g. without considering index values attributed to the indices. Thus, the processing of the series may rely on few steps, saving computational effort.

According to an embodiment, the series of corrected input values 17 has the same length as the series of input values 12. For example, the series of corrected input values 17 may be reshaped or resampled to have the same number of data points as the series of input values 12, for example in order to avoid artefactual discontinuities arising from a patching operation, or from a stitching operation.

For better understanding, the functionality and some features of the apparatus 10 may be described in the context of time series and in the context of an input signal provided by an ultrasonic transceiver. Thus, an index value attributed to an input value or a template value may represent a time value within a time interval spanned by the series of input values or the series of template values. However, time is only exemplary for a physical domain, to which the input values and the template values may refer, so that the series may also refer to another measureable size. In general, the concept may be applicable to any series, without the need of an index value being attributed to an element of the series. Similarly, ultrasonic signals are only an exemplary application of the presented concept. Nevertheless, the concept may also be applied to other signals, in particular to signals that are subject to noise signals the form of which is approximately known or expected.

Figure 2:
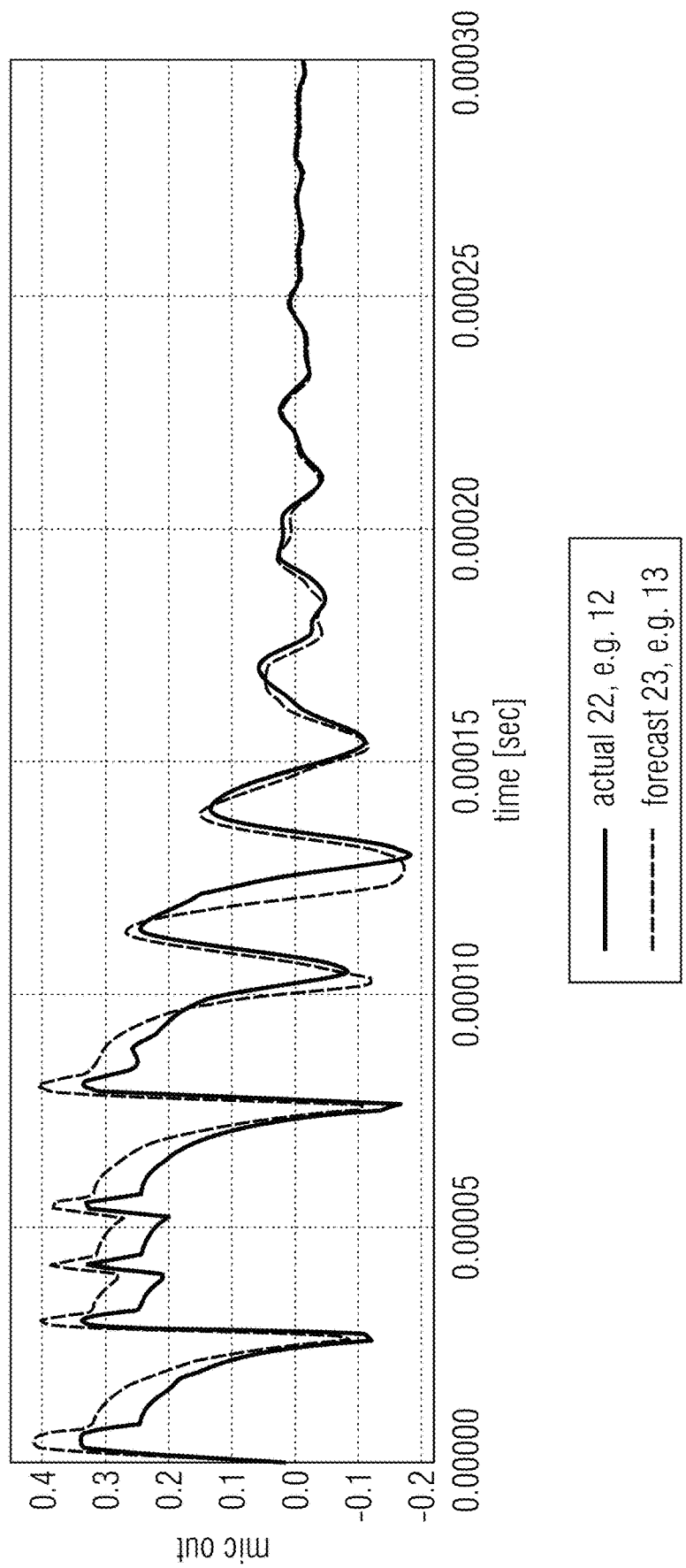
FIG. 2 shows a diagram comprising examples of a series of input values and a series of template values.

FIG. 2 shows a diagram comprising a series of template values 23 and a series of input values 22, which may correspond to the series of template values 13 and the series of input values 12, respectively. The series 22 and 23 are time series of an output signal of a microphone, e.g. a CMUT, as it may be used in the context described in the introduction. The series 22, 23 shown in FIG. 2 span an exemplary interval from 0 to 0.3 ms. For example, the series of input values 22 comprises a noise signal, but a contribution of a signal of interest, e.g. an ultrasonic signal such as an echo, to the series of input values 22 may be negligible or not present. Nevertheless, as shown in FIG. 2, there may be a mismatch between the series of template values 23 and the series of input values 22.

Accordingly, the input signal 11 may represent a time series of a measured value, and the series of template values 13 may comprises a time series of a noise signal. Further, the series of input values 12 and the series of template values 13 may cover an equal timespan.

Figure 3:
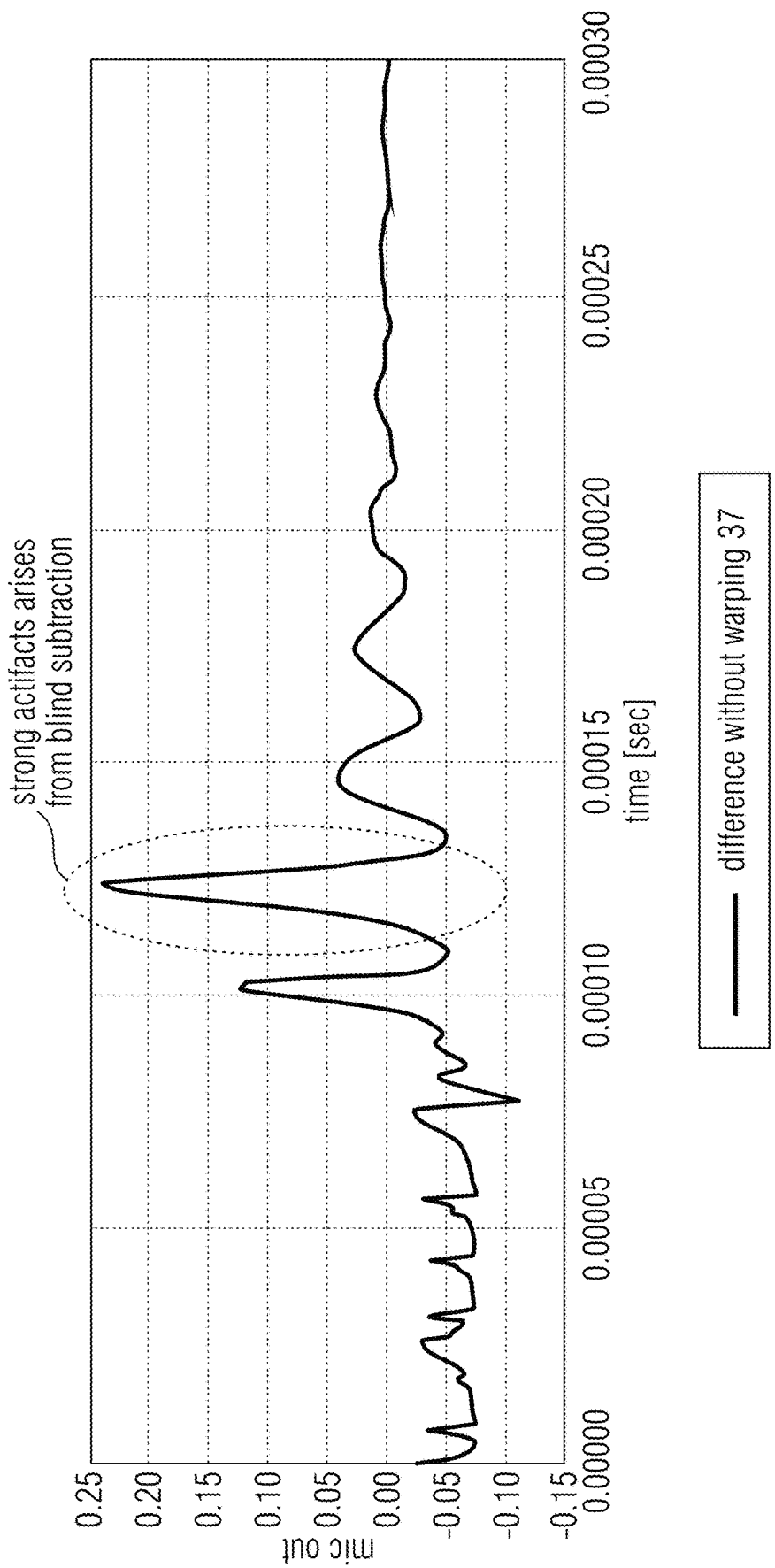
FIG. 3 shows a diagram comprising a result of a blind subtraction of the input signal and the template according to a conventional solution.

FIG. 3 shows a diagram comprising a series of corrected values 37 as it may result from a conventional solution, namely as it may result from a blind subtraction of series of template values 23 from the series of input values 22. Blind subtraction may refer to a subtraction without matching the series of template values 23 to the series of input values 22, for example by subtracting a template value from an input value having the same time value, i.e. the same index value, as the template value. As indicated in region 38, strong artefact peaks may arise from the blind subtraction, which may lead to a false-positive echo detection in the case of ultrasonic signal detection. In other words, FIG. 3 may show an example of a template subtraction with mismatches, e.g. amplitude and phase mismatches. For example, artifact peaks that may arise from the procedure, may lead to a false-positive echo detection, e.g. in an ultrasonic signal.

Figure 4:
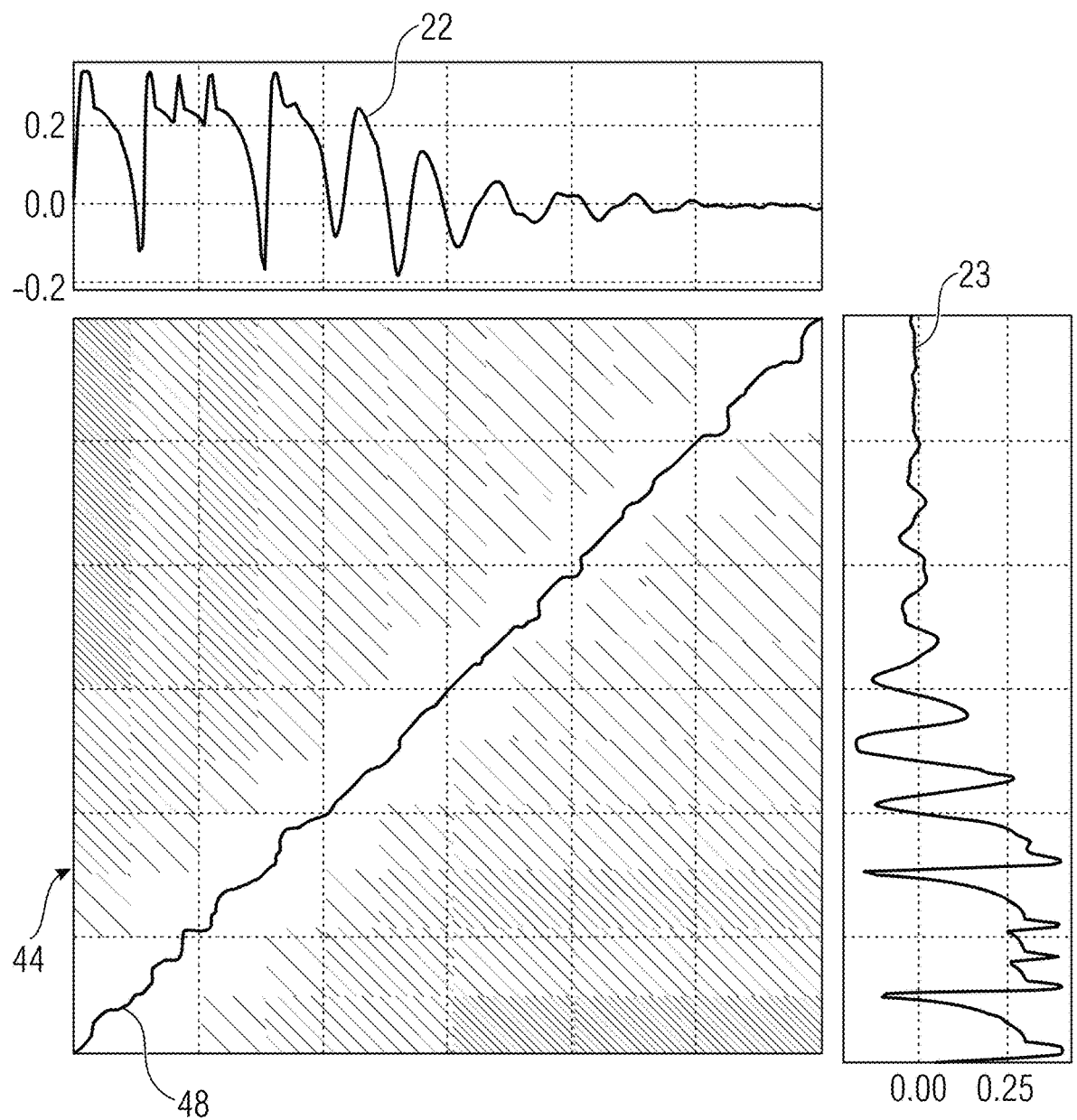
FIG. 4 illustrates a warping path according to an embodiment.

FIG. 4 illustrates the procedure of matching of the series of template values 23 to the series of input values 22 according to an embodiment. FIG. 4 shows a cost matrix 44, in which the abscissa may indicate an index of the series of template values 23 and the ordinate may indicate an index of the series of input values 22. For example, a brightness value of a point with the coordinates (i, j) may indicate a cost, e.g. a contribution to a distance of a warping path, of assigning a template value with index i to an input value with index j. A warping path 48 assigns a template value to an input value by assigning an index of the series of template values 23 to an index of the series of input values 22. The warping path 48 may represent a warping path W with a low or minimal distance Dist(W). For example, the warping path 48 may be obtained by means of a DTW algorithm.

Figure 5:
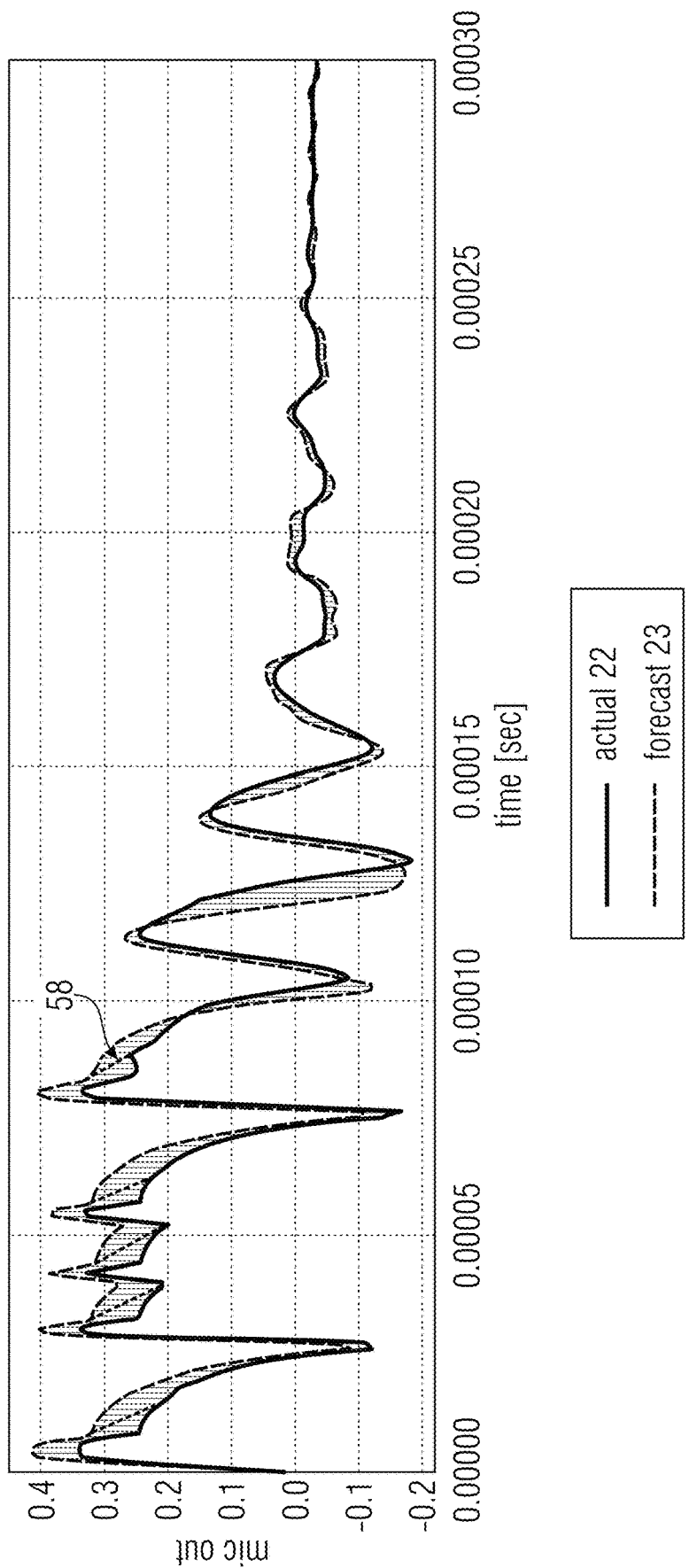
FIG. 5 illustrates an assignment between input values and template values according to an embodiment.
Figure 6:
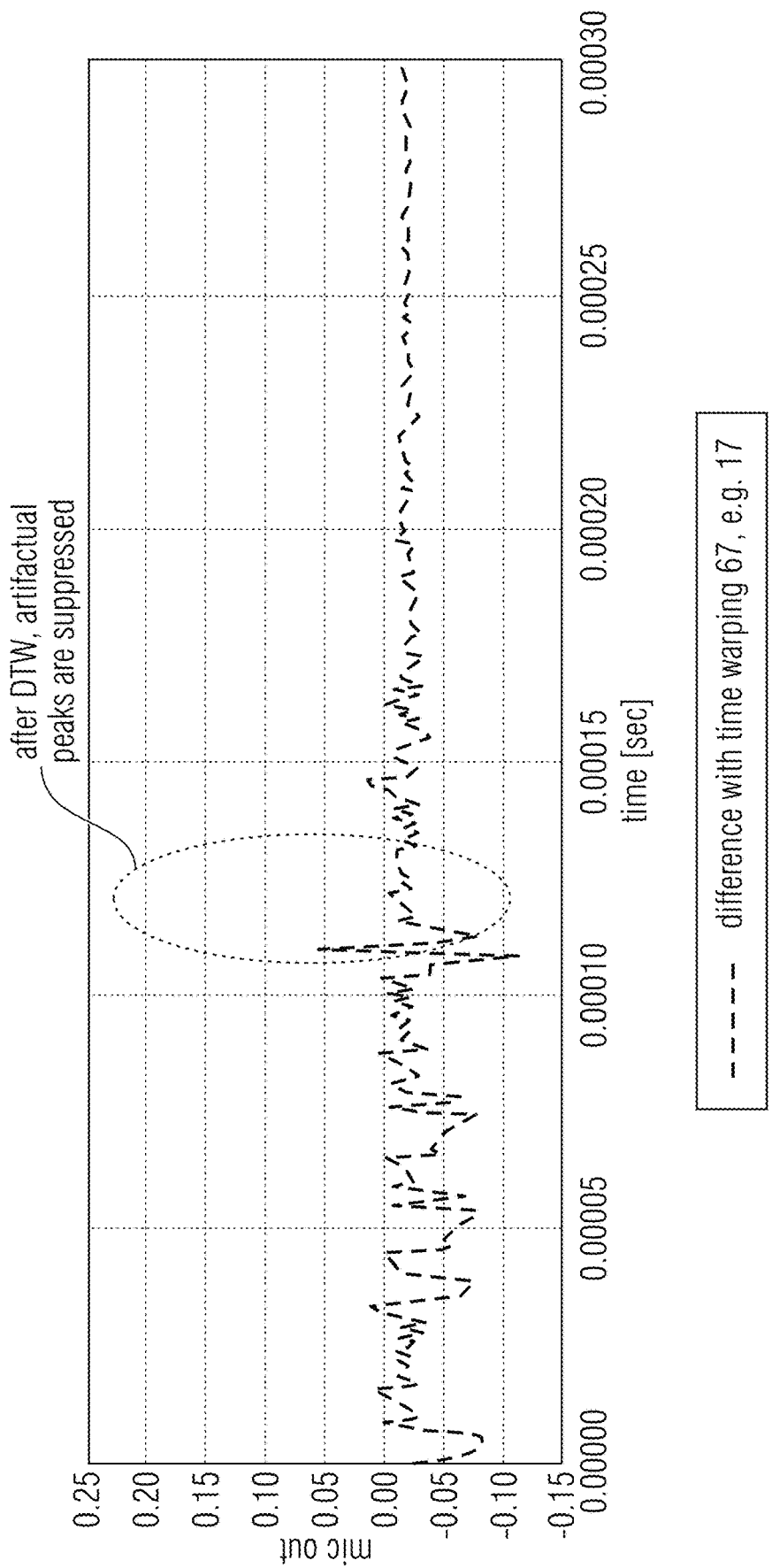
FIG. 6 shows a series of corrected input values according to an embodiment.

FIG. 5 shows a diagram comprising the series of input values 22 and the series of template values 23. Lines 58 between input values and template values indicate the assignment between the template values and the input values. As indicated, an input value may be assigned to a template value that is shifted along the time axis with respect to the input value. FIG. 6 shows a diagram comprising a series of corrected input values 67, which may correspond to the series of corrected input values 17. For example, the series of corrected input values 67 may have been obtained by subtracting a template value of the series of template values 23 from its assigned input value of the series of input values 22. The series of corrected input values 67 may correspond to a template subtraction with mismatches, after application of DTW as matching mechanism. Compared to the blind subtraction 37 shown in FIG. 3, the artificial peak does not appear in the series of corrected input values 67.

In other words, an effectiveness of the ad-hoc transformation is illustrated by FIGS. 3, 6, where spurious peaks within a blanking zone are suppressed when applying the warping beforehand, for example by comparing a subtraction without warping shown in FIG. 3 to a subtraction with warping shown in FIG. 6.

Figure 7:
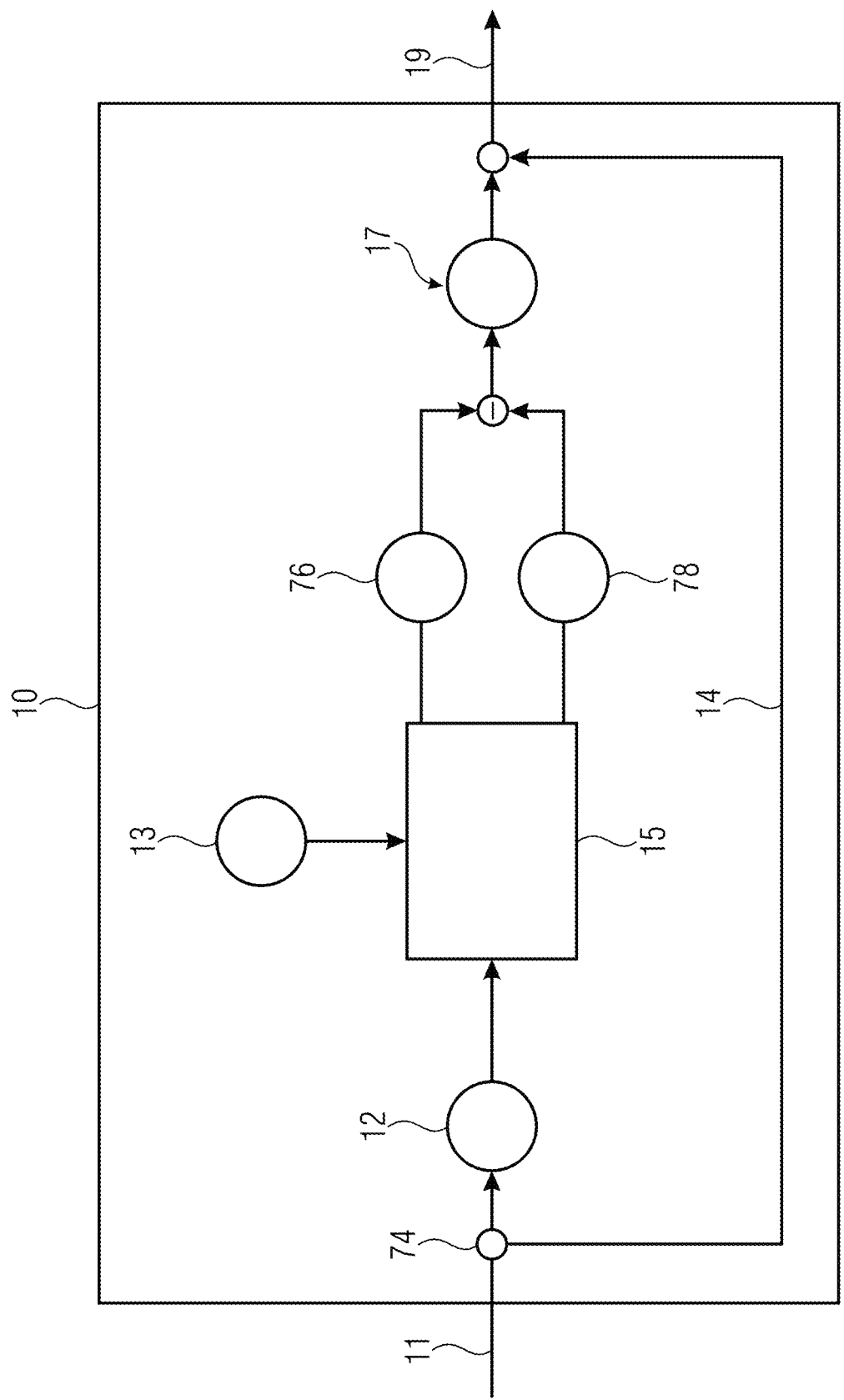
FIG. 7 shows a schematic representation of an apparatus for correcting an input signal according to another embodiment.

FIG. 7 shows a schematic representation of a further embodiment of the apparatus 10, according to which the apparatus 10 comprises means, e.g. the matching unit 15, for obtaining a corrected template 76 and a series of warped input values 78 based on the matching of the series of template values 13 to the series of input values 12. Further, the apparatus 10 may be configured for obtaining the series of corrected input values 17 based on a difference between the series of warped input values 78 and the corrected template 76. For example, the corrected template 76 comprises a series of corrected template values which may be obtained by assigning a template value to a corrected template value, the assigned template value having an index or an index value that equals an index or an index value of an input value assigned to a template value having an equal index or index value as the corrected template value.

According to an embodiment, the apparatus 10 is configured for splitting the input signal 11 into a plurality of intervals, e.g. by means of a splitting unit 74. The plurality of intervals comprises an interval of interest, within which the noise signal is expected to occur. The interval of interest comprises the series of input values 12, which is to be matched with the series of template values 13. By splitting the input signal 11 into a plurality of intervals, correcting the input signal 11 with the series of template values 13 may be applied selectively to the interval of interest. Thus, the correction is not necessarily applied to an interval of the input signal 11 that is not expected to be corrupted by the noise signal. Thus, the series of template values 13 and the series of input values 12 may be chosen to be shorter, so that computational effort may be saved. Further, avoiding correcting an interval which is not expected to be corrupted by the noise signal, may limit artefacts of the correction, which may possibly occur, to the interval of interest. Such, the quality of the corrected signal may be enhanced.

For example, the selective transformation, for example, the splitting of the input signal into an interval of interest and one or more further intervals, may be made possible due to the presence of dedicated boundary conditions in the algorithm definition for example in the definition of the algorithm for matching the series of input values 12 to the series of template values 13. For example, given two time series $X=x_1, x_2, \ldots x_{|m|}$ and $Y=y_1, y_2, \ldots y_{|N|}$, the boundary conditions may enforce that the first elements of X and Y are aligned to each other, and that the last elements of X and Y are aligned to each other. Thus, the alignment may be selectively applied to the interval where the noise signal, for example, the membrane reverberation is expected to be. Thus, no discontinuities may arise from the processing steps, for example the splitting of the input signal.

It is pointed out, that the feature of the splitting unit 74 and the feature of obtaining a corrected template 76 shown in FIG. 7 are independent from each other.

For example, the splitting unit 74 may provide a part of the input signal that is not part of the series of input values as a passthrough input signal 14. For example, a sum of a length of the series of input values 12 and a length of the passthrough input signal 14 may equal a length of the input signal. The apparatus 10 may stitch or join the series of corrected input values 17 and the passthrough input signal 14 so as to obtain the corrected signal 19.

According to an alternative embodiment, the passthrough input signal 14 may represent the input signal 11, and the apparatus 10 may patch the passthrough input signal 14, i.e. the input signal 11, with the series of corrected input values 17 so as to obtain the corrected signal 19.

Accordingly, the apparatus 10 may be configured for patching the interval of interest of the input signal 11 using the series of corrected input values 17, so as to obtain the corrected signal 19. For example, patching the interval of interest may be performed by replacing the series of input values 12 in the input signal 11 by the series of corrected input values 17.

According to an embodiment, the corrected template 76 and the series of input values 12 have an equal length, so that artefactual discontinuities in the patching may be avoided, for example in a patching operation or a stitching operation for obtaining the corrected signal 19 from the series of corrected input values 17 and the passthrough input signal 14, e.g. an unprocessed ultrasonic signal.

According to an embodiment, the corrected template 76 and the series of warped input values 78 are resampled in order to have the equal length as the series of input values 12. Hence, the subtraction may be performed efficiently by pairwise subtraction and the resulting series of corrected input values 17 can be patched to the passthrough input signal 14 without additional discontinuities.

Figure 8:
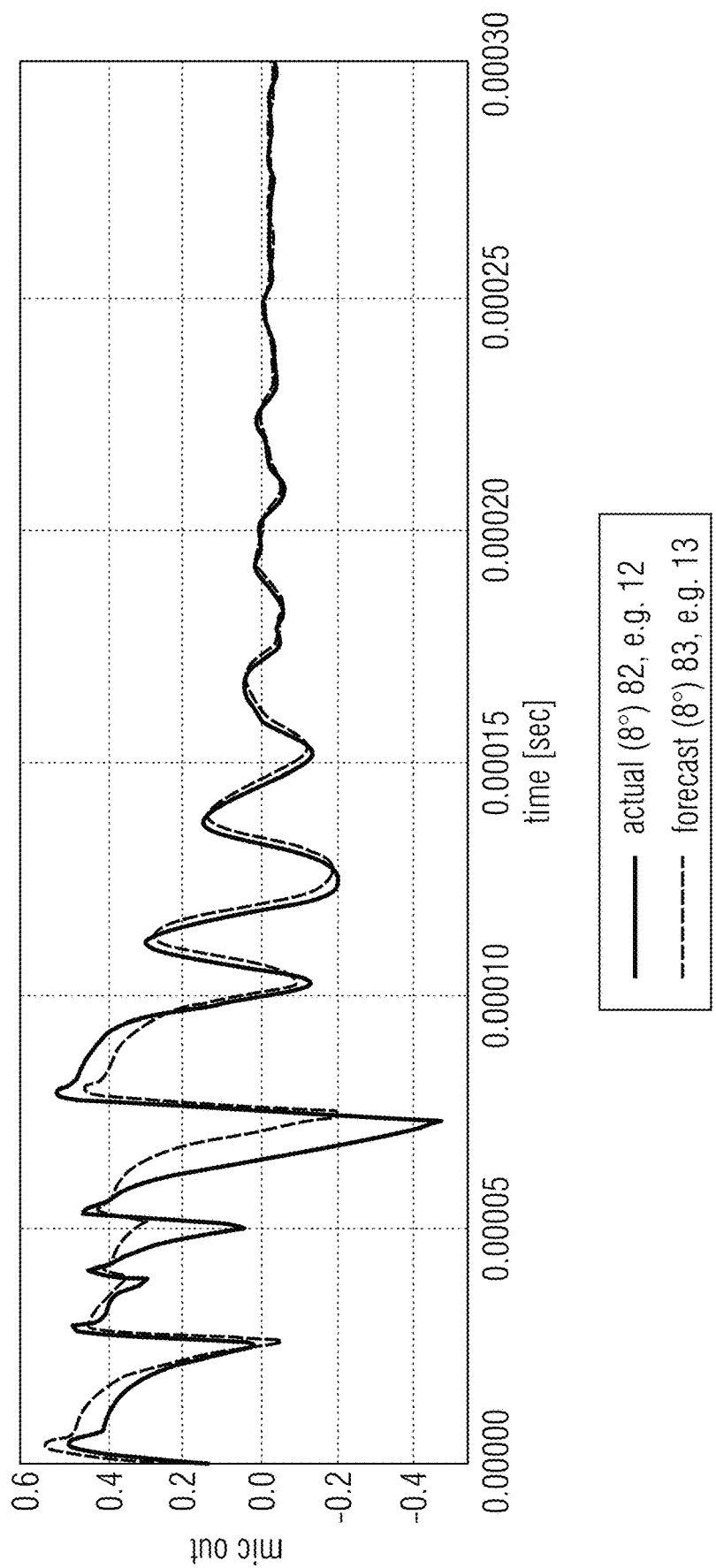
FIG. 8 shows a diagram comprising examples of the series of template values and the series of input values according to an embodiment.
Figure 9:
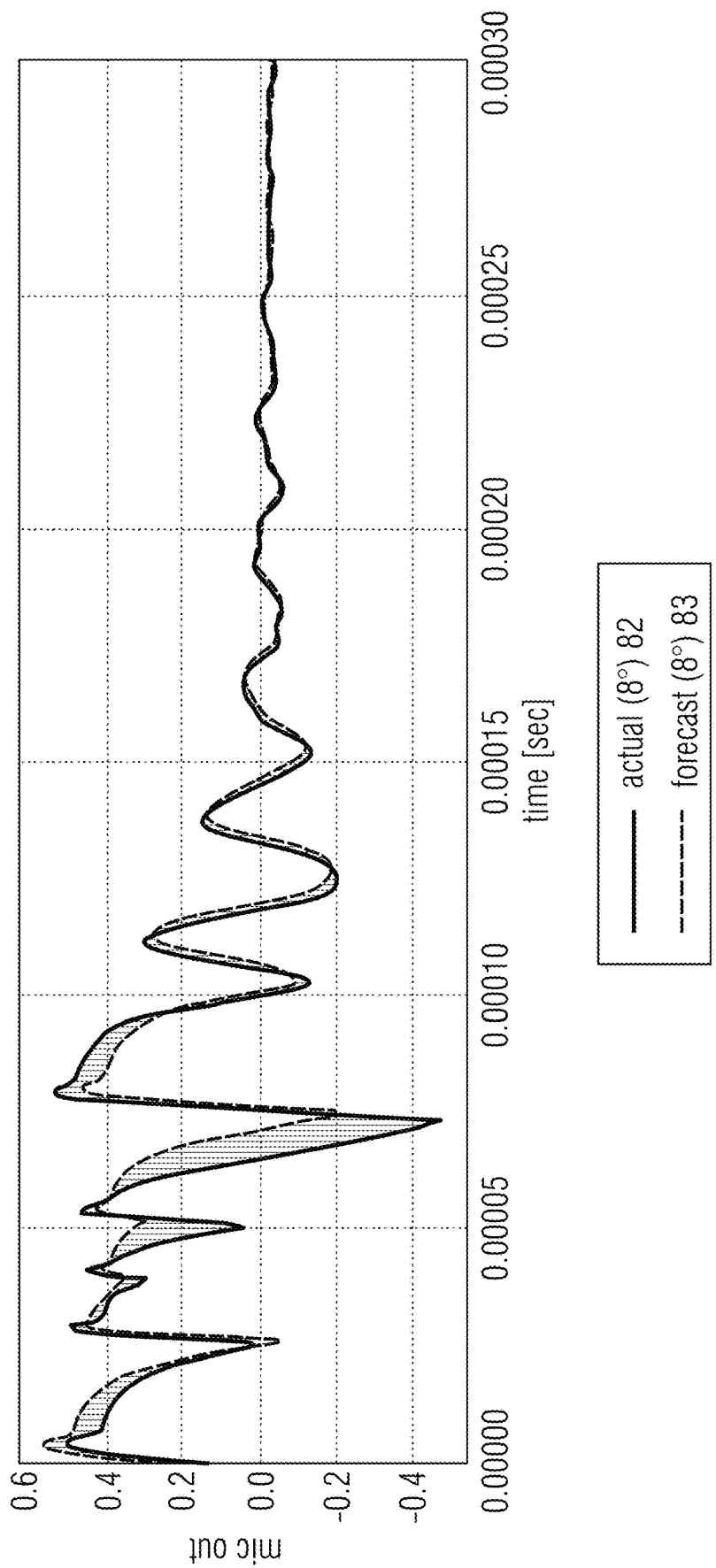
FIG. 9 illustrates an assignment between input values and template values according to an embodiment.
Figure 10:
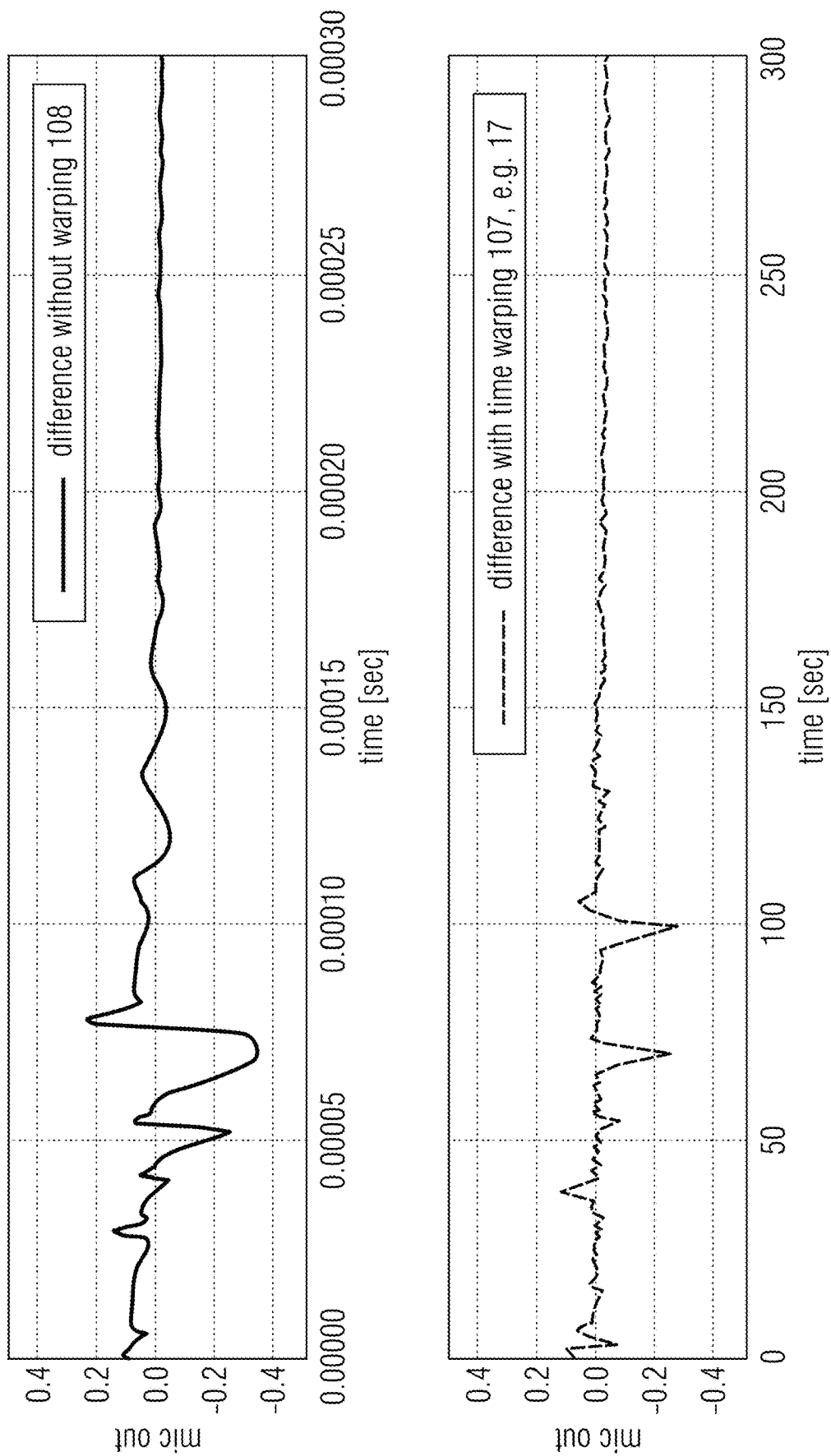
FIG. 10 shows two diagrams comprising series of corrected input values according to a conventional solution and according to an embodiment, respectively.
Figure 11:
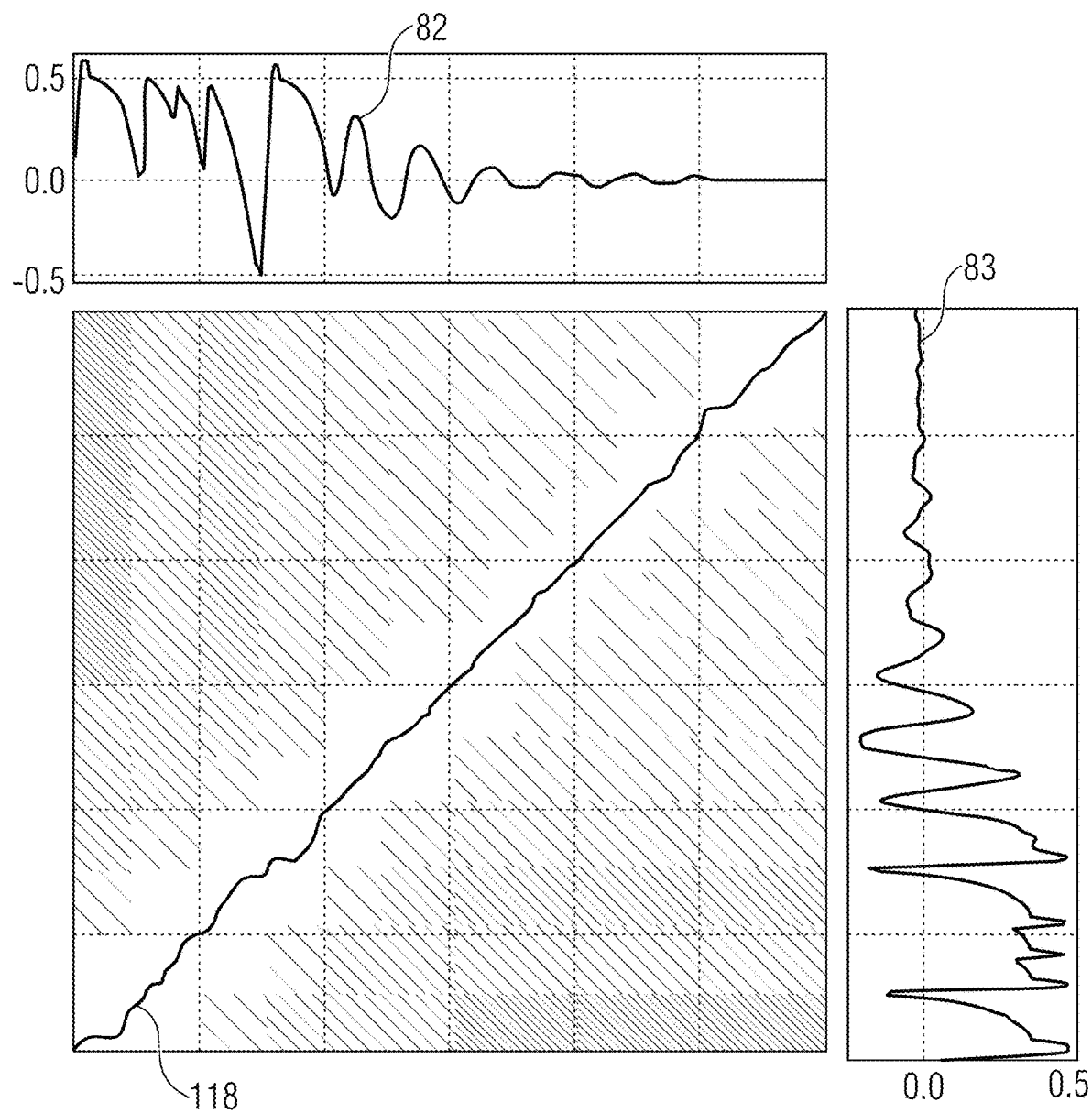
FIG. 11 illustrates a warping path according to an embodiment.

FIG. 8 shows a diagram comprising a series of template values 83 and a series of input values 82, which may correspond to the series of template values 13 and the series of input values 12, respectively. No signal of interest or echo may be present in the series of input values 82. FIG. 9 shows a diagram comprising the series of template values 83 and the series of input values 82, and illustrating the assignment of template values to input values. The assignment of the input values to the template values may be based on the warping path 118 as shown in FIG. 11, which illustrates the matching of the series of the series of template values 83 and the series of input values 82 according to an embodiment, similar to the illustration shown in FIG. 4. FIG. 10 shows a comparison between a series of corrected input values 108 and a series of corrected input values 107. The series of corrected input values 108 may be a result of a conventional correction of the series of input values 82 using a blind subtraction. The series of corrected input values 107 may correspond to the series of corrected input values 17 and may be a result of using a DTW algorithm. As visible from FIG. 10, the series of corrected input values 107 may have a lower amplitude and a different frequency compared to the series of corrected input values 108.

According to an embodiment, the apparatus 10 is configured for identifying a part of the series of corrected input values 17 as a signal of interest, if the corrected input values of the part of the series of corrected input values 17 exceed a threshold value. Further, the apparatus 10 may be configured for identifying a part of the series of corrected input values 17 as a residual noise signal, if the corrected input value of the part of the series of corrected input vales 17 do not exceed the threshold value. For example, the series of corrected input values 17 may comprise a signal, e.g. deviate from 0, even if the input signal does not comprise a signal of interest, as it may be the case for the series of input values 22 and 82. In contrast, as may be seen in FIG. 6 and in the lower panel of FIG. 10, the series of corrected input values 17, 67, 107, may comprise a residual noise signal. For example, a further use of the corrected signal 19 may depend on the indication of the apparatus 10, whether the corrected signal 19 comprises a signal of interest or not. Thus, processing effort may be saved in the case that no signal of interest is detected.

In other words, a DTW algorithm may be tuned to reconstruct a time warped signal. When the figure of merit shows low or minimum realizations i.e. a high degree of similarity between two time series, the warped subtraction may lead to the highest suppression and spurious peaks are suppressed. When the figure of merit shows high realizations i.e. low degree of similarity between the two time series, the warped subtraction may give origin to residual errors, which may corresponds to a searched echo and may then furtherly be processed. In short, echoes appearing in the blanking region may only be partially affected by the selective DTW transformation, guaranteeing improved object detection capabilities in the very-close proximity range.

According to an embodiment, the apparatus 10 is configured for applying a frequency filter to the series of corrected input values 17. For example, applying the frequency filter may facilitate differentiating a signal of interest from an artificial signal originating from the correction of the input signal 19 or from a residual noise signal. For example, a residual noise signal or a signal originating from the correction of the input signal 19, may have a different frequency than a signal of interest that is expected to occur in the input signal 19. For example, the signal of interest is expected to have a specific frequency. Thus, the frequency filter may be a band pass filter configured for transmitting a frequency of the signal of interest while attenuating frequencies that deviate by more than 50% or 20% or 5% from the frequency of the signal of interest. Thus, the frequency filter may further enhance a signal to noise ratio of the corrected signal 19.

Figure 12:
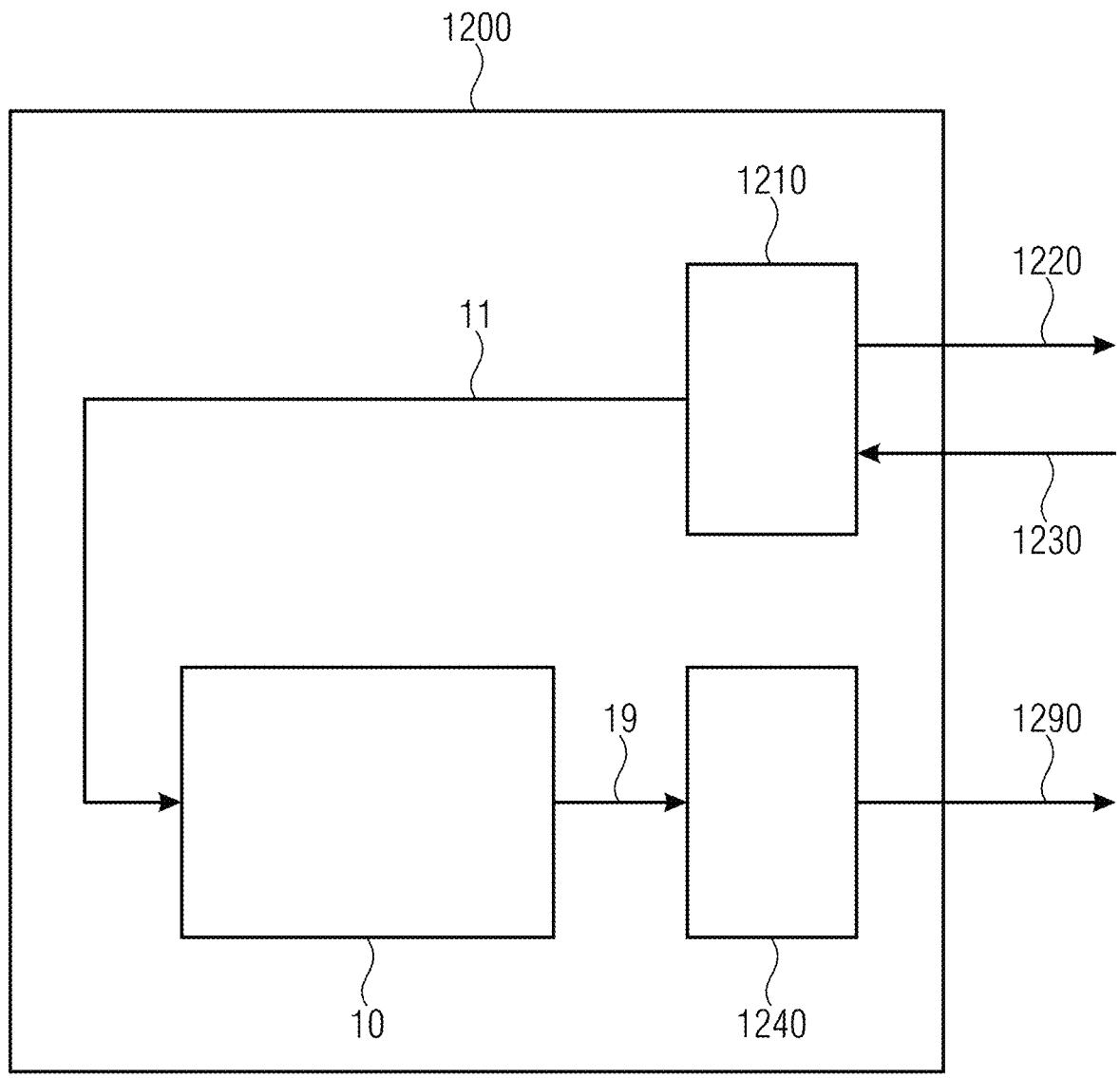
FIG. 12 shows a schematic representation of an apparatus for obtaining an information about a TOF of an ultrasonic signal according to an embodiment.

FIG. 12 shows a schematic representation of an apparatus 1200 for obtaining information 1290 about a TOF of an ultrasonic signal 1220 according to an embodiment. The apparatus 1200 comprises a transceiver 1210, configured for transmitting the ultrasonic signal 1220 during a first time span, and configured for receiving an ultrasonic signal 1230 during a second time span. The transceiver 1210 is configured for providing an input signal 11 representing the received ultrasonic signal 1230 in a time series. The apparatus 1200 further comprises the apparatus 10 for correcting an input signal, configured for receiving the input signal 11 and configured for providing the corrected signal 19. Further, the apparatus 1200 comprises means, e.g. a signal processor 1240, for obtaining the information 1290 about the TOF of the ultrasonic signal by evaluating the corrected signal 19.

For example, the received ultrasonic signal 1230 may originate from a reflection of the ultrasonic signal 1220 at a surface region of an object facing the apparatus 1200. Thus, the apparatus 1200 may obtain the information 1200 about the TOF of the ultrasonic signal by determining a time difference between transmitting the ultrasonic signal 1220 and receiving the ultrasonic signal 1230. For this purpose, the apparatus 1200 may determine an instant of time of receiving the ultrasonic signal 1230 by evaluating the input signal 11, which may comprise a time series comprising the series of input values.

Figure 13:
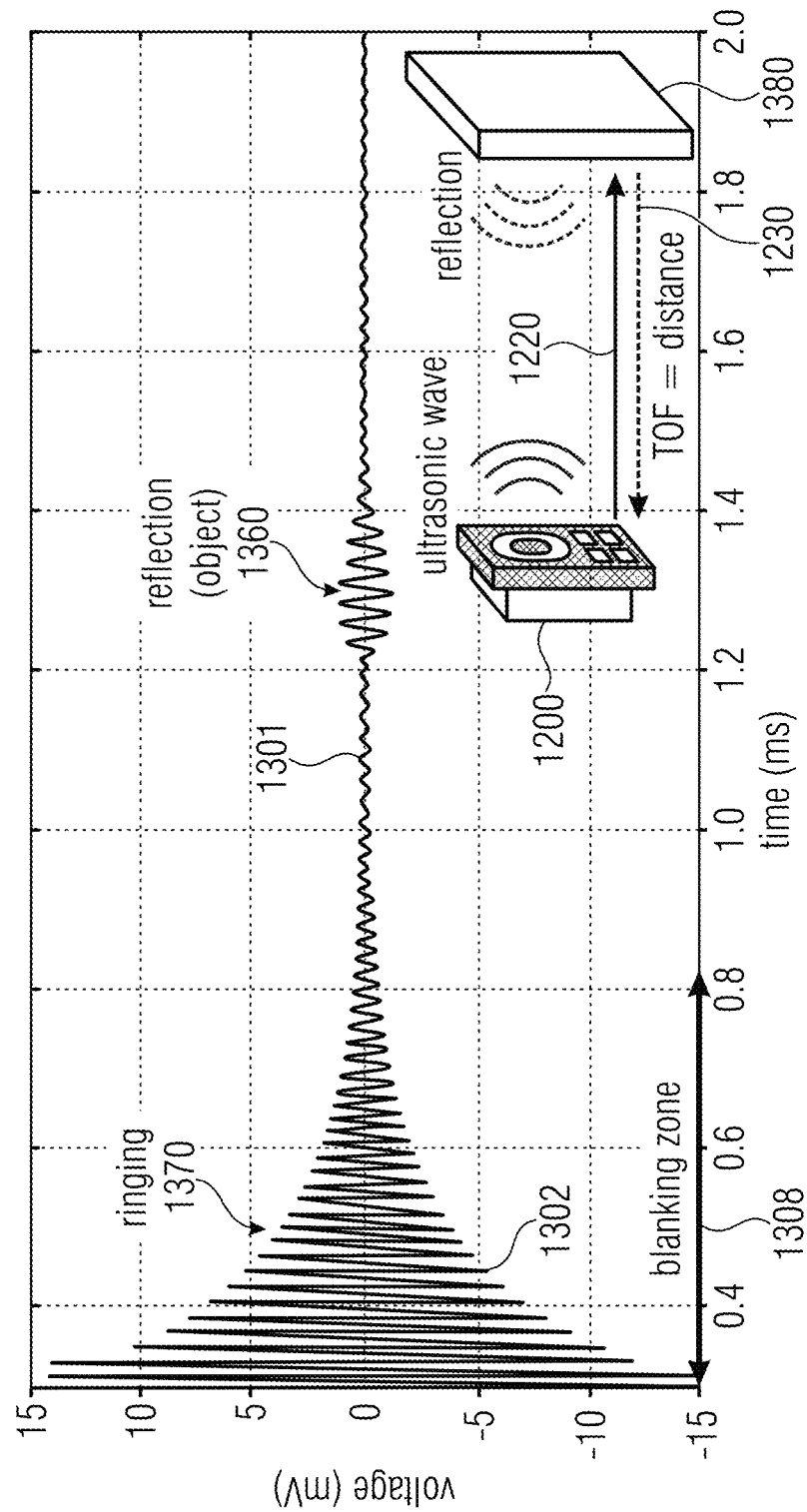
FIG. 13 shows a diagram comprising an input signal according to an embodiment.

FIG. 13 shows a diagram comprising an input signal 1301 which may correspond to the input signal 11. The input signal 1301 is a time series of input values which may be provided by the transceiver 1210, e.g. as a voltage. The inset of FIG. 13 illustrates an exemplary arrangement of an example of the apparatus 1200 and an object 138, which is an origin of a reflection 1230 of an ultrasonic signal 1220 transmitted by the apparatus 1200. For example, the reflected ultrasonic signal 1230 may be referred to as an echo of the ultrasonic signal 1220. For example, the information about the TOF of an ultrasonic signal may be a time between transmitting the ultrasonic signal and receiving the echo of the ultrasonic signal. A distance between the transceiver 1210 and the object 1380 may be inferred from the information 1290 about the TOF of the ultrasonic signal. The input signal 1301 comprises a ringing 1370 which may correspond to the noise signal. For example, the ringing 1370 may arise from a reverberation of the transmitter 1210 after transmitting the ultrasonic signal 1220. The time frame within which the ringing 1370 occurs may be referred to as blanking zone and may be selected as the interval of interest 1308 for the correction of the input signal 1301. Thus, the input values of the input signal 1301 within the blanking zone 1308 may represent a series of input values 1302 which may correspond to the series of input values 12. As the ringing 1370 may be characteristic for the transmitter 1210, the ringing 1370 may be described by an example of the series of template values 13. However, the ringing 1370 may change over time. The input signal 1301 further comprises an echo 1360 which may correspond to the signal of interest. An amplitude of the echo 1360 may be lower than an amplitude of the ringing 1370. Therefore, the echo 1360 may be difficult to detect if a distance between the transmitter 1210 and the object causing the echo 1360 is low, so that the echo 1360 occurs within the blanking zone.

As the ringing may be characteristic for the used transceiver 1210, it may be corrected by using a template 13. However, degradation or variations between different transceivers may modify the ringing, so that degradation over time could bring to false-positive echo detection as in case of blind subtraction. Matching the template to the input signal may prevent such a false-echo detection.

Figure 14:
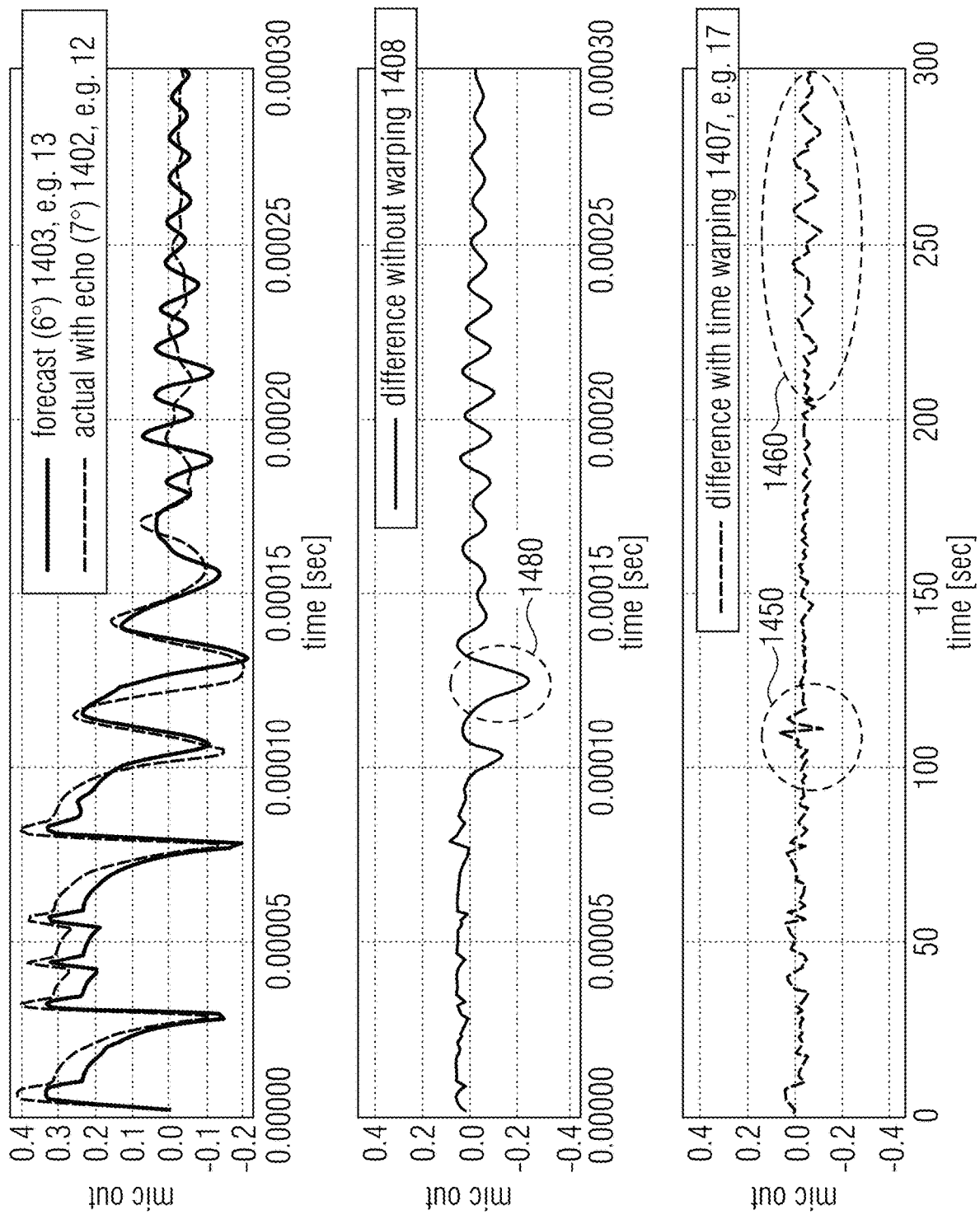
FIG. 14 shows diagrams illustrating corrections of an input signal according to a conventional solution and according to an embodiment, respectively.

The upper panel of FIG. 14 shows a diagram comprising a series of input values 1402, which may correspond to the series of input values 12 and a series of template values 1403, which may correspond to the template 13. The series of input values 1402 comprises a signal representing a ringing of an ultrasonic transceiver and an echo 1460 of an ultrasonic signal. The second panel comprises a difference between the series of input values 1402 and the series of template values 1403 determined without using the warping. The difference signal 1408 comprises a high amplitude peak 1480 which represents an artefact of the template subtraction. The lower panel of FIG. 14 shows a series of corrected input values 1407 as an example of the series of correct input values 17. The series of corrected input values 1407 comprises a residual noise signal 1450 and further comprises a signal representing an echo 1460. For example, the residual noise signal 1450 may have a different, e.g. a higher frequency than the signal of interest 1460. In other words, FIG. 14 may illustrate an example of a DTW algorithm applied in presence of an echo. Spurious peaks in the blanking zone may be suppressed while the echo signal 1460 may remain unchanged, or may remain detectable in the corrected signal.

According to an embodiment, the apparatus 10 is configured for applying a frequency filter to the corrected signal. The frequency filter is configured for transmitting a signal with a frequency within a range of ±50%, preferably ±20%, more preferably ±5% of a frequency of the transmitted ultrasonic signal 1220 and configured for attenuating a signal with a frequency outside the range. For example, by applying the frequency filter, a residual noise signal, for example the residual noise signal 1450, may be attenuated, while a signal of interest, for example the echo 1460, may be transmitted. Thus, the frequency filter may prevent a false detection of echo signal in case of a residual noise signal.

According to an embodiment, the series of input values 12 and the series of template values 13 cover a timespan of a ringing of the transceiver 1210 after transmitting the ultrasonic signal 1220. For example, the timespan may be 0 to 1 ms after transmitting the ultrasonic signal 1220. By covering the timespan of the ringing of the transceiver, a noise signal originating from a reverberation of the transceiver may be efficiently corrected.

Figure 15:
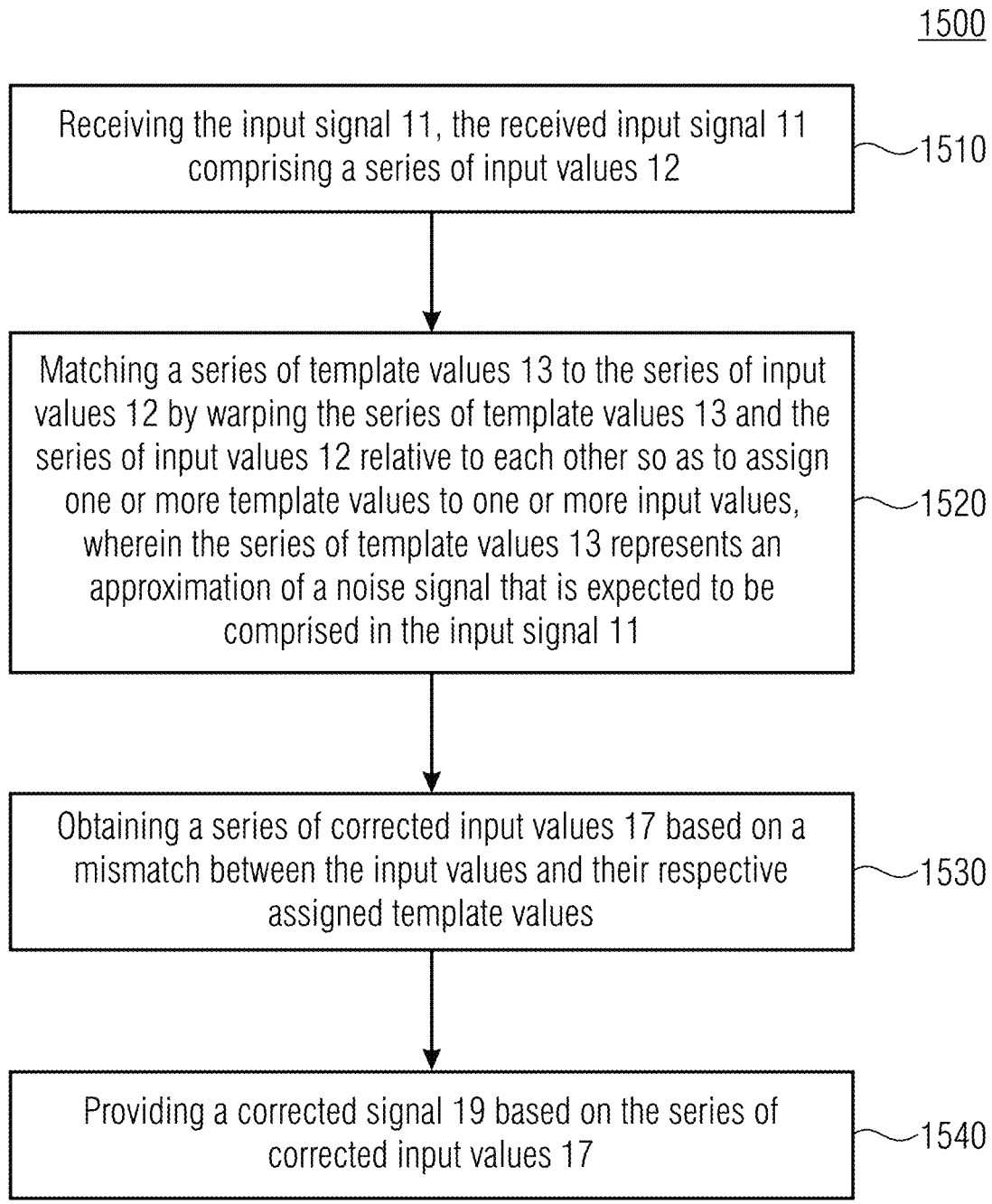
FIG. 15 shows a flow-chart of a method for correcting an input signal according to an embodiment.

FIG. 15 shows a flow chart of a method 1500 for correcting an input signal 11 according to an embodiment. The method 1500 comprises a step 1510 of receiving the input signal 11, the received input signal 11 comprising a series of input values 12. The step 1520 comprises matching a series of template values 13 to the series of input values 12 by warping the series of template values 13 and the series of input values 12 relative to each other so as to assign one or more template values to one or more input values. The series of template values 13 represents an approximation of a noise signal that is expected to be comprised in the input signal 11. The method 1500 further comprises a step 1530 of obtaining a series of corrected input values 17 based on a mismatch between the input values and their respective assigned template values. Further, the step 1540 comprises providing a corrected signal 19 based on the series of corrected input values 17.

The method 1500 provides the features, functionalities and advantages described with respect to the apparatus 10 for correcting an input signal 11.

Figure 16:
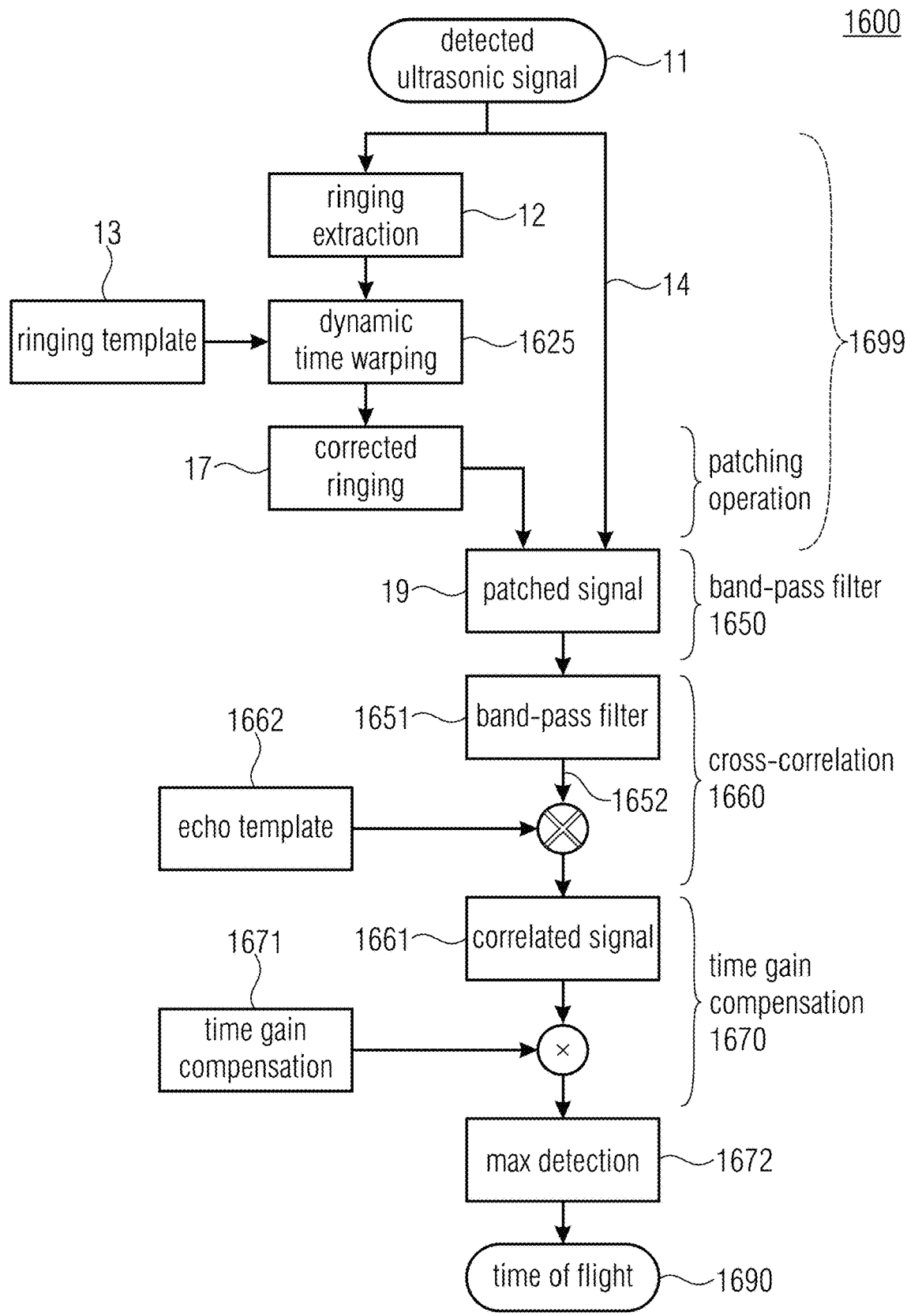
FIG. 16 shows a flow-chart of a method for obtaining an information about a TOF of an ultrasonic signal according to an embodiment.

FIG. 16 shows a flow chart of a method 1600 for obtaining an information about a TOF of an ultrasonic signal according to an embodiment. For example, the method 1600 may be implemented by the apparatus 1200. The method 1600 comprises a step 1699 of correcting the input signal 11. The step 1699 may be an implementation of the method 1500. The input signal 11 may represent a detected ultrasonic signal. The step 1699 may comprise splitting the detected ultrasonic signal 11 into intervals so as to obtain a series of input values 12 which may represent an interval of the detected ultrasonic signal 11 within which a ringing is to be expected. In other words, an a-priori knowledge about the localization and duration of a membrane reverberation may be exploited to segment the time series 11 into intervals. The splitting may also be referred to as signal windowing. The selective transformation may bring considerable advantages in the blanking zone, while maintaining unaltered the echo signal-to-noise ratio after or without the blanking zone, since not suppressed by adaptive mechanisms.

Further, the step 1699 comprises a step 1625, in which the series of input values 12 is matched to a series of template values 13. Hence, the warping may be selectively applied only to the first interval of the time series, leaving the remaining epochs of the recorded time series 11 untouched. The template 13 may represent an approximation of the ringing. For example, the step 1625 may rely on a DTW algorithm. For example, the step 1625 implements the steps 1520, 1530 of the method 1500. The step 1625 may provide a series of corrected input values 17. A patching operation may use the series of corrected input values 17 for patching the detected ultrasonic signal 11, so as to obtain the corrected or patched signal 19. In a step 1650, a band pass filter 1651, for example a frequency filter is applied to the patched signal 19 so as to obtain a filtered signal 1652. In a further step 1660 a cross-correlation between the filtered signal 1652, e.g. a warped difference, and an echo template 1662 is determined, so as to obtain a correlated signal 1661. For example, the echo template 1662 comprises information about a transmitted ultrasonic signal being a basis or an origin of an echo which may be comprised in the detected ultrasonic signal 11. For example, the echo template 1662 is based on a form of the transmitted ultrasonic signal and/or may comprise information about a transfer function or response function of the transceiver or other hardware in the signal chain. In a further step 1670 a maximum of the correlated signal 1661 is determined based on a time gain compensation 1671. For example, a detected maximum may represent a received echo, so that the information 1290 about a TOF of the ultrasonic signal may be estimated based on a position of the detected maximum on the time axis.

Figure 17:
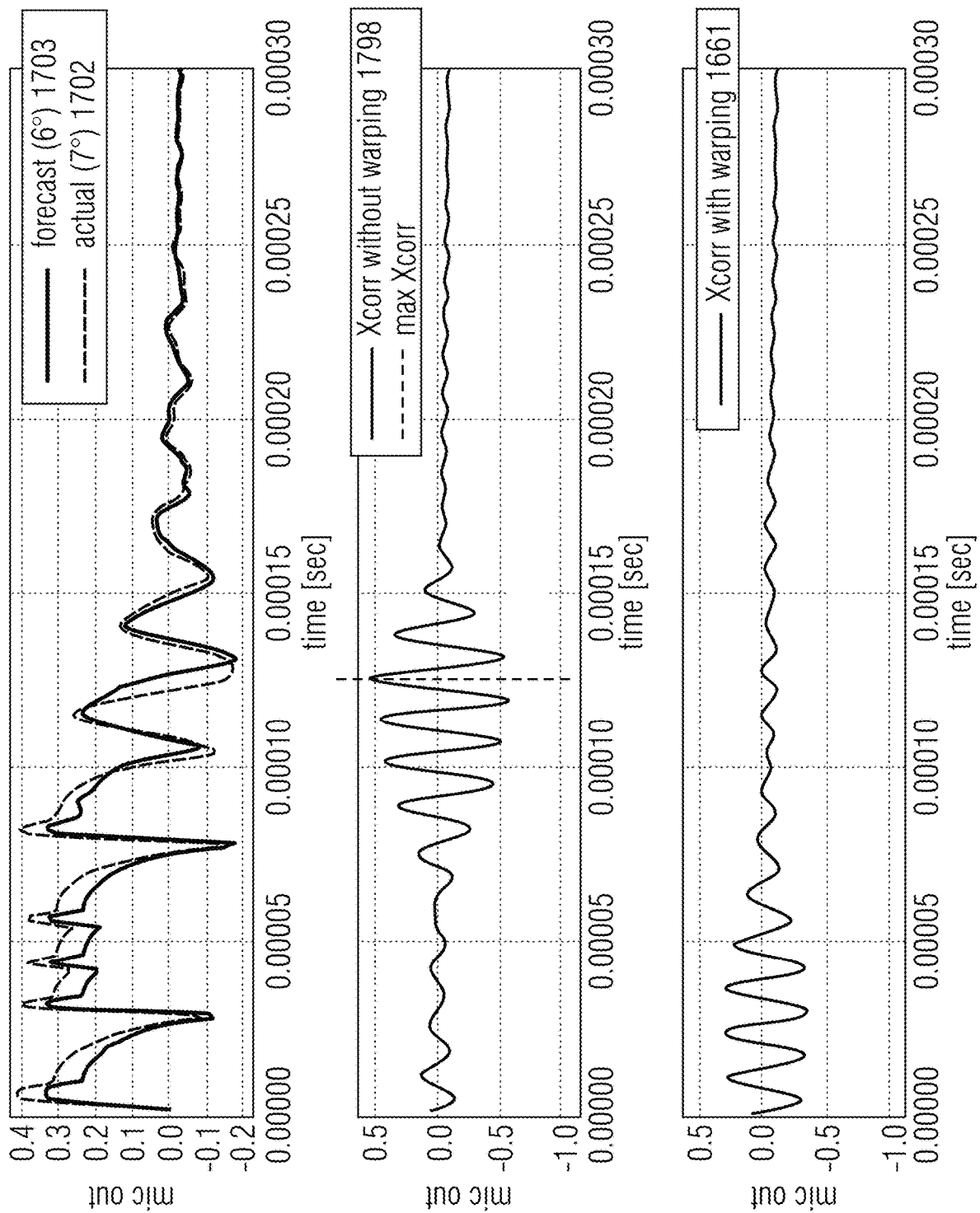
FIG. 17 shows diagrams illustrating cross-correlated signals according to a conventional solution and according to an embodiment.

The upper panel of FIG. 17 shows a diagram comprising a series of template values 1703 and a series of input values 1702, which may correspond to the series of template values 13 and the series of input values 12, respectively. The series of input values 1702 may represent a case of no echo in the blanking zone. The second panel of FIG. 17 shows a diagram comprising a cross correlated signal 1798. The cross-correlated signal 1798 may have been derived by a method similar to the method 1600, wherein the step 1625 is replaced by a simple blind subtraction. The cross-correlation 1798 of the blind difference may lead to a false echo detection. The lower panel of FIG. 17 shows an example of the cross-correlated signal 1661 which may have been derived as described with respect to FIG. 16. A maximum or a local maximum of the cross-correlated signal 1661 occur in a region where no echo may be expected, for example due to actuation. Thus, no object may be detected based on the cross-correlated signal 1798.

Figure 18:
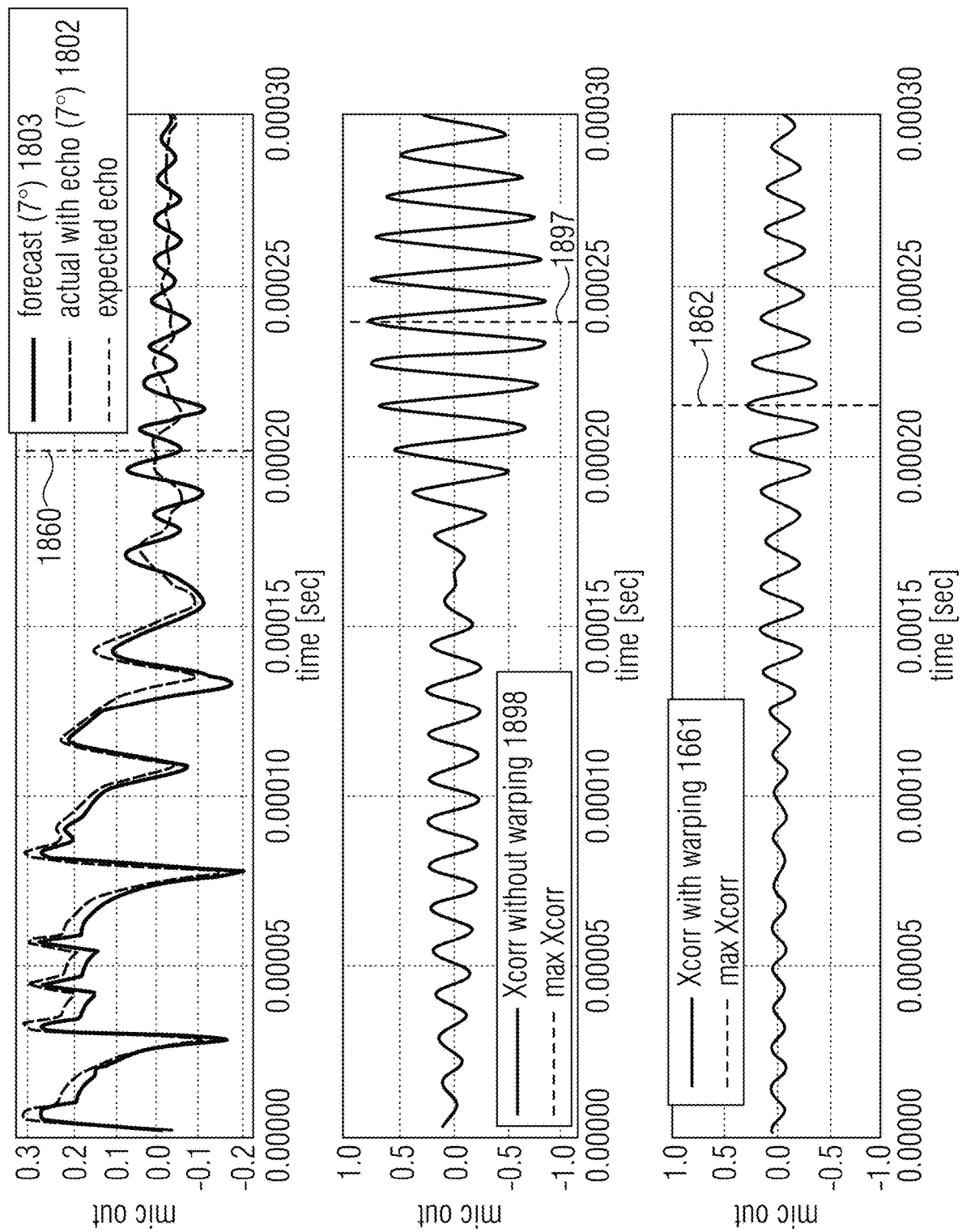
FIG. 18 shows diagrams illustrating cross-correlated signals according to a conventional solution and according to another embodiment.

The upper panel of FIG. 18 shows a diagram comprising a series of template values 1803 and a series of input values 1802, which may correspond to the series of template values 13 and the series of input values 12, respectively. The series of input values 1802 may represent a case of an overlapping echo in the blanking zone, for example the series of input values 1802 may comprise a signal representing an echo 1860. The second panel of FIG. 18 shows a cross-correlated signal 1898 which may have been derived based on a blind subtraction, similar to the cross-correlated signal 1798 of FIG. 17. A maximum 1897 of the cross-correlated signal 1898 appears at a time value which is different from a time value of the echo 1860 in the upper panel. The lower panel of FIG. 18 shows a diagram comprising an example of the correlated signal 1661 which may have been derived as described with respect to FIG. 16. A maximum 1862 of the cross-correlated signal 1661 is close to a position of the echo 1860 of the upper panel. Thus, the cross-correlation 1661 of the warped difference, for example a series of corrected input values derived from the series of input values 1802 and the series of template values 1803, may lead to a more accurate detection of the echo 1860 compared to the cross-correlated signal 1898, although a signal to noise ratio of the cross correlated signal 1661 may be lower.

Figure 19:
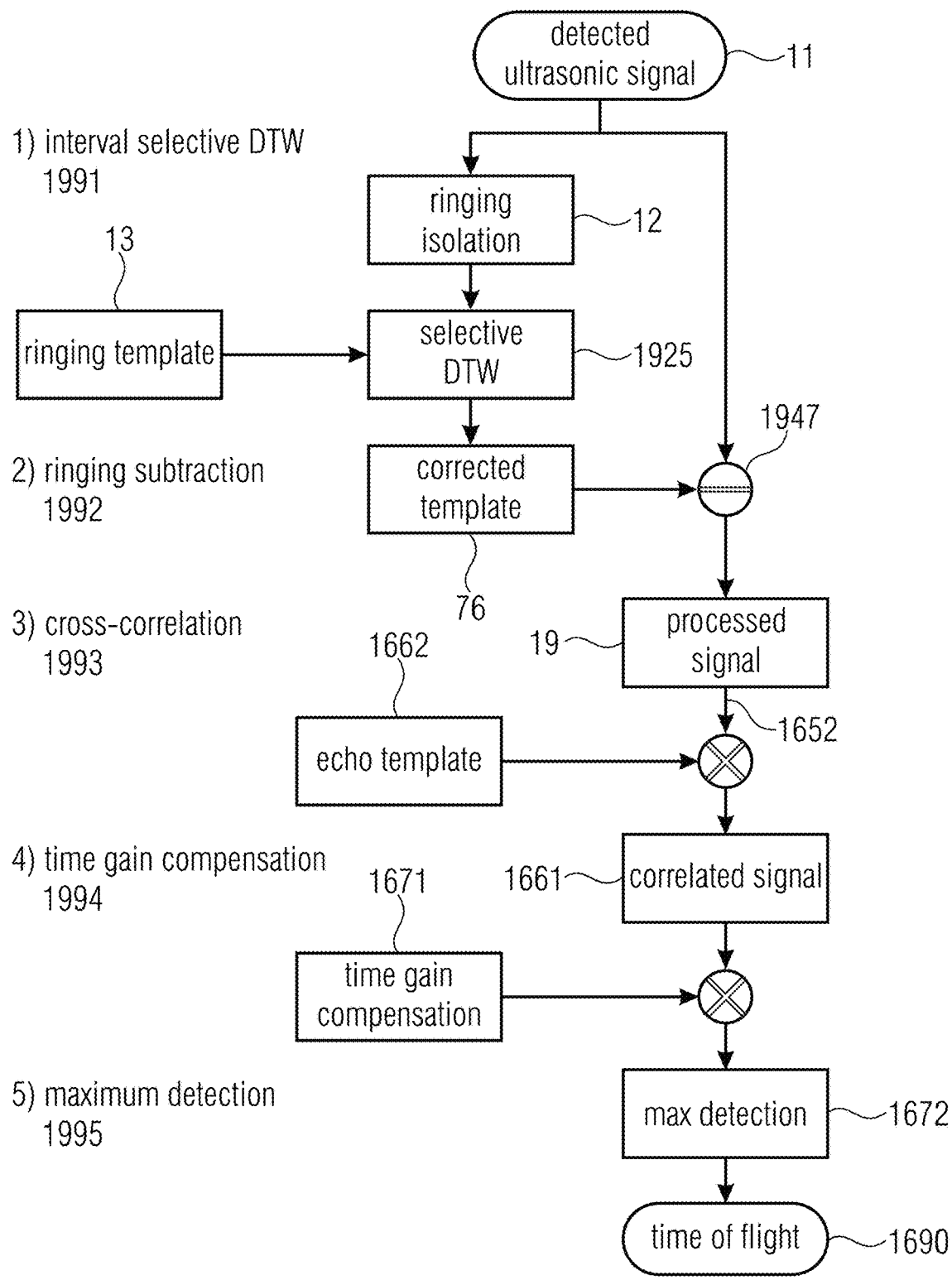
FIG. 19 shows a flowchart of a method for obtaining an information about a TOF of an ultrasonic signal according to another embodiment.

FIG. 19 shows a method 1900 for obtaining an information 1290 about a TOF of an ultrasonic signal according to an embodiment. The method 1900 is based on the method 1600 comprising the indicated features of the method 1600. In the method 1900, the step 1625 is replaced by a step 1925. Step 1925 comprises matching the series of input values 12 and the series of template values 13 and comprises obtaining the corrected template 76. The method 1900 comprises a subtraction 1947 of the corrected template 76 from the input signal 11. For example, the corrected template may be zero-padded for subtracting it from the input signal 11. In other words, the warped template 76 may be zero-padded in order to reach the length of the received time series 11, which may constitute the corrected template 76. The subtraction 1947 results in a processed signal which may be similar to the patched signal 19.

In other words, the described method 1900 may reach from signal windowing, for membrane ringing epoch identification, to TOF estimation for echo detection. Specifically, a block 1991 may be referred to as Interval Selective DTW and may be responsible for signal windowing, cost function calculation and template warping. A following block 1992 may represent a proper Ringing subtraction. The subtraction may lead to a 'similarity fingerprint', which may be zero-padded to return the Corrected Template 76.

The disclosed apparatuses 10, 1200 and methods 1500, 1600, 1900 may fulfill low-power requirements, for example of mobile applications. Ultrasonic usage in mobile devices is attractive for disparate applications such as range finding, presence detection, wind/temperature measurement, gesture classification. When considering single CMUT, the ringing subtraction problem may have to be taken into account.

Thus, the disclosed apparatuses 10, 1200 and methods 1500, 1600, 1900 provide a low-cost methodology for effective ringing suppression for precise short-range measurements with ultrasonic transceivers. The concept may embed a DTW-based non-linear transformation for epochs-selective warping of a membrane reverberation artifact. The selectivity may be guaranteed by the a-priority knowledge of the localization and duration of the artifacts, as well as by the selection of appropriate boundary conditions. The concept may return a warped difference as similarity fingerprint, which may be used for ringing suppression in the real-time recorded signal. When the similarity is high, the subtraction may return its minimum realization, i.e. zeroing the warped difference. When the similarity is low, the subtraction may contain residuals which are assumed to be constituents of the echo and thus used for subsequent processing. The concept may implement a low-complexity always-on mechanism for template matching which may guarantee enhanced adaptability to diverse MEMS devices, e.g. revealing manufacturing tolerances, as well as adaptability for the same devices, which proved to be variable overtime e.g. due to temperature changes. The concept may enable a reduced calibration routine since the same template can be stored in each sensor, allowing mass-applications. Thus, the base template is adjusted automatically for each device.

According to an alternative aspect, the matching of the template 13 to the series of input values 12 is based on a template-matching algorithm based on a Kalman filter. The implementation of the Kalman filter based matching may determine matching points, for example best matching points, between the reference ringing template, e.g. the template 13, and the real-time recorded data, e.g. the series of input values. The implementation of the Kalman filter based matching may comprise a prediction step which may be based on inference from a prior knowledge state, and may comprise an update step which may be based on a comparison between a prediction and a measurement, e.g. the input values.

For example, the prediction step is unbounded and the filter or the matching may be applied to the entire ultrasonic recording, e.g. the series of input values 12 may represent the entire range of the input signal 11.

Additional embodiments and aspects are described which may be used alone or in combination with the features and functionalities described herein.

According to an embodiment, an apparatus 10 for correcting an input signal 11 is configured for: receiving the input signal 11, the received input signal 11 comprising a series of input values 12; matching a series of template values 13 to the series of input values 12 by warping the series of template values 13 and the series of input values 12 relatively to each other so as to assign one or more template values to one or more input values, wherein the series of template values 13 represents an approximation of a noise signal that is expected to be comprised in the input signal 11; obtaining a series of corrected input values 17 based on a mismatch between the input values and their respective assigned template values; providing a corrected signal 19 based on the series of corrected input values 17.

According to another embodiment, matching the series of template values 13 to the series of input values 12 comprises assigning one or more template values to one or more input values so as to decrease a sum of absolute distances between the input values and their respective assigned template values.

According to another embodiment, matching the series of template values 13 to the series of input values 12 comprises using a dynamic time warping algorithm for assigning the template values to the input values.

According to another embodiment, the apparatus 10 is configured for obtaining a corrected template 76 and a series of warped input values 78 based on the matching of the series of template values 13 to the series of input values 12; and the apparatus 10 is configured for obtaining the series of corrected input values 17 based on a difference between the series of warped input values 78 and the corrected template 76.

According to another embodiment, the apparatus 10 is configured for splitting the input signal 11 into a plurality of intervals comprising an interval of interest 1308, within which the noise signal is expected to occur, wherein the interval of interest 1308 comprises the series of input values 12, which is to be matched with the series of template values 13.

According to another embodiment, the apparatus 10 is configured for patching the interval of interest 1308 of the input signal 11 using the series of corrected input values 17, so as to obtain the corrected signal 19.

According to another embodiment, the input signal 1301 represents a time series of a measured value; the series of template values 13 comprises a time series of a noise signal; and wherein the series of input values 12 and the series of template values 13 cover an equal time span.

According to another embodiment, the apparatus 10 is configured for identifying a part of the series of corrected input values 17 as a signal of interest, if the corrected input values of the part of the series of corrected input values 17 exceed a threshold value; and the apparatus 10 is configured for identifying a part of the series of corrected input values 17 as a residual noise signal, if the corrected input values of the part of the series of corrected input values 17 do not exceed the threshold value.

According to another embodiment, the apparatus 10 is configured for applying a frequency filter to the series of corrected input values 17.

According to another embodiment, the series of input values 12 and the series of template values 13 have equal lengths.

According to another embodiment, an apparatus 1200 for obtaining an information 1290 about a time of flight of an ultrasonic signal comprises: a transceiver 1210, configured for transmitting the ultrasonic signal 1220 during a first time span, and configured for receiving an ultrasonic signal 1230 during a second time span, wherein the transceiver 1210 is configured for providing an input signal 11 comprising the received ultrasonic signal 1230 in a time series; the apparatus 10 for correcting an input signal according to any of the preceding embodiments, configured for receiving the input signal 11 and configured for providing the corrected signal 19; means 1240 for obtaining the information 1290 about the time of flight of the ultrasonic signal by evaluating the corrected signal 19.

According to another embodiment, the apparatus 1200 is configured for applying a frequency filter to the corrected signal 19, wherein the frequency filter is configured for transmitting a signal with a frequency within a range of ±50%, preferably ±20%, more preferably ±5% of a frequency of the transmitted ultrasonic signal 1220 and configured for attenuating a signal with a frequency outside of the range.

According to another embodiment, the series of input values 12 and the series of template values 13 cover a time span of a ringing of the transceiver 1210 after transmitting the ultrasonic signal 1220.

According to another embodiment, a method 1500 for correcting an input signal 11, comprises: receiving 1510 the input signal 11, the received input signal 11 comprising a series of input values 12; matching 1520 a series of template values 13 to the series of input values 12 by warping the series of template values 13 and the series of input values 12 relatively to each other so as to assign one or more template values to one or more input values, wherein the series of template values 13 represents an approximation of a noise signal that is expected to be comprised in the input signal 11; obtaining 1530 a series of corrected input values 17 based on a mismatch between the input values and their respective assigned template values; providing 1540 a corrected signal 19 based on the series of corrected input values 17.

According to another embodiment, a computer program implements the method of the preceding embodiment when being executed on a computer or signal processor.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

In the foregoing Detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

The above described embodiments are merely illustrative for the principles of the present disclosure. It is understood that modifications and variations of the arrangements and the details described herein will be apparent to others skilled in the art. It is the intent, therefore, to be limited only by the scope of the pending patent claims and not by the specific details presented by way of description and explanation of the embodiments herein.

What is claimed is:

1. An apparatus for correcting an input signal, configured for
   transmitting an ultrasonic signal from an ultrasonic transceiver during a first time span,
   receiving an ultrasonic signal during a second time span,
   receiving the input signal from the transceiver, the received input signal comprising a time series of input values of the ultrasonic signal received during the second time span,
   matching a series of template values to the time series of input values by warping the series of template values and the time series of input values relatively to each other so as to assign one or more template values to one or more input values,
   wherein the series of template values represents an approximation of a noise signal that is expected to be comprised in the input signal, and wherein the time series of input values and the series of template values cover a time span of a ringing of the ultrasonic transceiver after transmitting the ultrasonic signal,
   obtaining a series of corrected input values based on a mismatch between the input values and their respective assigned template values, and
   providing a corrected signal based on the series of corrected input values,
   applying a frequency filter to the series of corrected input values, and wherein the frequency filter is configured for outputting a signal with a frequency within a range of ±5% of a frequency of the transmitted ultrasonic signal and configured for attenuating signals with frequencies outside of the range, and
   obtaining information about time of flight of the ultrasonic signal by evaluating the filtered corrected signal.

2. The apparatus according to claim 1,
wherein matching the series of template values to the series of input values comprises assigning one or more template values to one or more input values so as to decrease a sum of absolute distances between the input values and their respective assigned template values.

3. The apparatus according to claim 2,
wherein matching the series of template values to the series of input values comprises using a dynamic time warping algorithm for assigning the template values to the input values.

4. The apparatus according to claim 1,
wherein the apparatus is configured for obtaining a corrected template and a series of warped input values based on the matching of the series of template values to the series of input values, and
wherein the apparatus is configured for obtaining the series of corrected input values based on a difference between the series of warped input values and the corrected template.

5. The apparatus according to claim 1,
wherein the apparatus is configured for splitting the input signal into a plurality of intervals comprising an interval of interest, within which the noise signal is expected to occur,
wherein the interval of interest comprises the series of input values, which is to be matched with the series of template values.

6. The apparatus according to claim 5,
wherein the apparatus is configured for patching the interval of interest of the input signal using the series of corrected input values, so as to obtain the corrected signal.

7. The apparatus according to claim 1,
wherein the input signal represents a time series of a measured value,
wherein the series of template values comprises a time series of a noise signal, and
wherein the series of input values and the series of template values cover an equal time span.

8. The apparatus according to claim 1,
wherein the apparatus is configured for identifying a part of the series of corrected input values as a signal of interest, if the corrected input values of the part of the series of corrected input values exceed a threshold value, and
wherein the apparatus is configured for identifying a part of the series of corrected input values as a residual noise signal, if the corrected input values of the part of the series of corrected input values do not exceed the threshold value.

9. The apparatus according to claim 1,
wherein the series of input values and the series of template values have equal lengths.

10. A method for correcting an input signal, comprising:
receiving the input signal, the received input signal comprising a time series of input values representing a received ultrasonic signal,
matching a series of template values to the series of input values by warping the series of template values and the series of input values relatively to each other so as to assign one or more template values to one or more input values,
wherein the series of template values represents an approximation of a noise signal that is expected to be comprised in the input signal,
obtaining a series of corrected input values based on a mismatch between the input values and their respective assigned template values;
providing a corrected signal based on the series of corrected input values; and
wherein the time series of input values and the series of template values cover a time span of a ringing of an ultrasonic transceiver after transmitting an ultrasonic signal that results in the received ultrasonic signal.

11. The method of claim 10 executed on a computer or signal processor.

12. An apparatus for correcting an input signal, configured for
receiving the input signal, the received input signal comprising a series of input values,
matching a series of template values to the series of input values by warping the series of template values and the series of input values relatively to each other so as to assign one or more template values to one or more input values,
wherein the series of template values represents an approximation of a noise signal that is expected to be comprised in the input signal,
obtaining a series of corrected input values based on a mismatch between the input values and their respective assigned template values, and
providing a corrected signal based on the series of corrected input values,
wherein the apparatus further comprises:
a transceiver, configured for transmitting an ultrasonic signal during a first time span, and configured for receiving an ultrasonic signal during a second time span,
wherein the transceiver is configured for providing an input signal comprising the received ultrasonic signal in a time series; and
means for obtaining information about time of flight of the ultrasonic signal by evaluating the corrected signal,
wherein the series of input values and the series of template values cover a time span of a ringing of the transceiver after transmitting the ultrasonic signal.

* * * * *